United States Patent [19]
Inoue et al.

[11] Patent Number: 5,289,265
[45] Date of Patent: Feb. 22, 1994

[54] METHOD AND APPARATUS FOR MEASURING A COATING STATE

[75] Inventors: Akira Inoue; Yuji Kobayashi, both of Kanagawa; Shuji Shinoki, Hyogo, all of Japan

[73] Assignee: Sumitomo Electric Industries, Ltd., Osaka, Japan

[21] Appl. No.: 865,280

[22] Filed: Apr. 8, 1992

[30] Foreign Application Priority Data

| Apr. 11, 1991 | [JP] | Japan | 3-078806 |
| Apr. 25, 1991 | [JP] | Japan | 3-095439 |
| Apr. 25, 1991 | [JP] | Japan | 3-095440 |
| Apr. 25, 1991 | [JP] | Japan | 3-095441 |
| Apr. 25, 1991 | [JP] | Japan | 3-095442 |

[51] Int. Cl.$^5$ .............................. G01B 11/06
[52] U.S. Cl. .............................. 356/382
[58] Field of Search .............................. 356/381, 382

[56] References Cited

U.S. PATENT DOCUMENTS

| 2,998,745 | 9/1961 | McClellan | 356/382 |
| 3,307,446 | 3/1967 | Rottmann | 356/382 |
| 3,807,870 | 4/1974 | Kalman | 356/382 |
| 4,822,171 | 4/1989 | Brand et al. | 356/382 |

FOREIGN PATENT DOCUMENTS

| 248552 | 12/1987 | European Pat. Off. | 356/382 |
| 0256539 | 2/1988 | European Pat. Off. | |
| 0294889 | 12/1988 | European Pat. Off. | |
| 320139 | 6/1989 | European Pat. Off. | 356/382 |
| 0348607 | 1/1990 | European Pat. Off. | |
| 1813847 | 7/1969 | Fed. Rep. of Germany | 356/382 |
| 93003 | 7/1980 | Japan | 356/382 |
| 120909 | 7/1984 | Japan | 356/382 |
| 60-238737 | 11/1985 | Japan | |
| 170008 | 6/1990 | Japan | 156/382 |

*Primary Examiner*—Richard A. Rosenberger
*Attorney, Agent, or Firm*—Cushman, Darby & Cushman

[57] ABSTRACT

A side surface of a coated optical fiber is irradiated with parallel light, and a light beam reflected by an outer surface of a resin portion to a particular direction and a light beam reflected by a boundary surface between the resin portion and a glass portion to a direction in parallel with the particular direction are selectively detected by an image sensor using a condenser lens and a pinhole member. A distance $d_2$ between the surface reflection light beam and the boundary reflection light beam and a distance $d_1$ between incident light beams corresponding to those reflection light beams are measured. A coating state is estimated based on the distances $d_1$ and $d_2$ thus measured.

32 Claims, 23 Drawing Sheets

STROBE SYNC SIGNAL
DATA PROCESSING SEC.

METHOD AND APPARATUS FOR MEASURING A COATING STATE

BACKGROUND OF THE INVENTION

The present invention relates to measurement of a thickness and a thickness variation (its degree and direction) of a coating formed on a linear body.

It is very difficult to use an optical fiber itself as a light transmission medium due to problems originating from its material. Therefore, in order to maintain initial strength (immediately after manufacture) of optical fibers and to assure their long-range durability, it is now a general procedure to coat an optical fiber with resin immediately after the wiredrawing to obtain a coated optical fiber.

FIG. 36 illustrates this procedure. An optical fiber 3 is formed by wiredrawing an optical fiber material 1 while heating and melting its tip portion by a furnace 2. As a general procedure, the optical fiber 3 is sequentially passed through a first pressurizing die 4A, first curing furnace 5A, second pressurizing die 4B and second curing furnace 5B to become a coated optical fiber 6 having two resin coating layers on its outer surface, which is then wound up on a reel 6 via a capstan 7. Examples of resin coating materials for the coated optical fiber 8 are polymers including thermosetting resins such as a silicone resin, urethane resin and epoxy resin, ultraviolet-curing resins such as an epoxy-acrylate, urethane-acrylate and polyester-acrylate, and radiation-curing resins.

In order to improve transmission characteristics and mechanical characteristics of the coated optical fiber 6, it is important that the resin coating be formed around the optical fiber 1 in a concentric manner.

On the other hand, when a wiredrawing speed is increased to improve productivity of optical fibers, it is likely that the thickness of the resin coating will vary, probably because a temperature increase in the optical fiber 1 causes nonuniformity of resin flow in the pressurizing dies 4A and 4B. The thickness variation also occurs when some dust is mixed into the resin.

Therefore, it is necessary in a wiredrawing manufacturing line of optical fibers that the thickness variation of the optical fiber 6 be measured within the manufacturing line and, upon occurrence of the thickness variation, control be properly performed to reduce the drawing speed or to stop the wiredrawing process.

Referring to FIG. 37, an example of a conventional thickness variation measuring method is described below, which is disclosed in Japanese Patent Application Unexamined Publication No. Sho. 60-238737. As shown in the figure, the thickness variation is measured by irradiating a side face of a coated optical fiber 10 being wiredrawn with a laser beam 12 emitted from a laser light source 11 and detecting a forward scattering light pattern 13.

FIG. 38 illustrates the principle of this measuring method. To simplify a discussion, it is assumed that the coated optical fiber 10 consists of a glass portion 10a and a resin portion 10b. Due to a difference in the refractive indices of the two portions (usually, the refractive index $n_g$ of the glass portion $10_a$ is approximately equal to 1.46, and the refractive index $n_r$ of the resin portion 10b is in the range of 1.48 to 1.51), the forward scattering light pattern 13 includes a central light flux 13a that has passed through the resin portion 10b, glass portion 10a and again through the resin portion 10b, and peripheral light fluxes 13b that have been transmitted through only the resin portion 10b. Therefore, the thickness variation can be detected based on the degree of symmetry in the horizontal direction in FIG. 37 and a ratio between light powers detected on both sides of the forward scattering pattern 13.

However, the above thickness variation measuring method is available only in such cases that the light passing through both of the resin portions 10b and the glass portion 10a and the light passing through only the resin portion 10b can be discriminated from each other clearly on both sides of the forward scattering pattern 13. For example, the thickness variation cannot be detected properly in the following cases: the coating diameter is small and the resin portion 10b is thin (FIG. 39) and the thickness variation is too large (FIG. 40). In the case of FIG. 39, since the resin portion 10b is too thin, there exists no light that passes though only the resin portion 10b, that is, all the light passes through both of the resin portions 10b and the glass portion 10a, so that the thickness variation cannot be detected. In the case of FIG. 40, since the resin portion 10b is very thin in the lower portion (as seen in FIG. 40), there is no light that passes through only the lower resin portion 10b. Therefore, although occurrence of the thickness variation will be known, its degree cannot be detected.

SUMMARY OF THE INVENTION

An object of the present invention is, therefore, to provide a technique which enables precise measurement of a coating thickness and its variation of a coated optical fiber within a manufacturing line, to manufacture high-performance optical fibers with high productivity. This technique will be applicable to a variety of technical fields.

According to the principle of the present invention, a side surface of a cylindrical linear body, which has a main body and a coating of at least one layer formed on the main body, is irradiated with incident light emitted from an light emitting section. A surface reflection light beam reflected by an outer surface of the coating to at least one particular direction and a boundary reflection light beam reflected by a boundary surface between the coating and the main body or by a boundary surface between adjacent layers of the coating to a direction in parallel with the particular direction are detected by a reflection light detecting section. The center of the main body is determined based on a reflection light distance between the surface reflection light beam and the boundary reflection light beam. A thickness and a variation in thickness of the coating can then determined based on the eccentricity of the center of the main body from the center of the cylindrical linear body.

Alternatively, the thickness and the thickness variation of the coating are determined based on an incident light distance between an incident light beam corresponding to the surface reflection light beam and another incident light beam corresponding to the boundary reflection light beam.

As a further alternative, the thickness and the thickness variation are determined based on both the reflection light distance and the incident light distance.

DESCRIPTION OF THE PREFERRED EMBODIMENTS

Before describing embodiments of the present invention, the principle of the invention is first described below.

Figure 34:
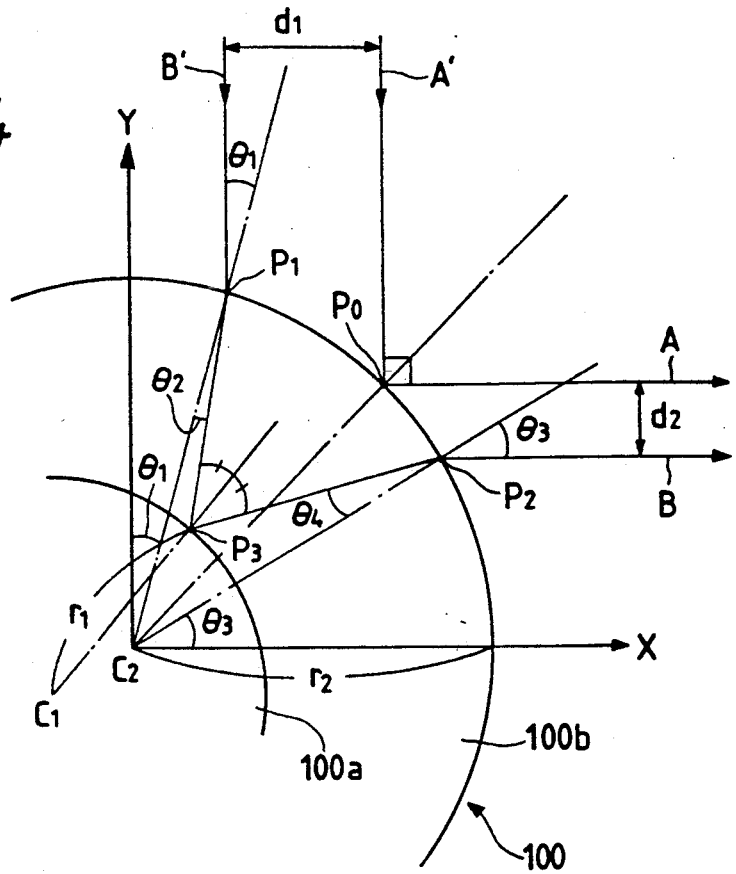
FIGS. 34 and 35 illustrate the principle of coating state measurement according to the invention.

As shown in FIG. 34, a coated optical fiber 100 as an example of an object linear body is assumed to consist of a glass portion 100a and a resin portion 100b, and is laterally irradiated with measuring light. Light beams A and B which are reflected by an outer surface and a boundary surface, respectively to a particular direction are detected to measure a distance therebetween, i.e., a positional deviation $d_2$ of reflected light. If necessary, a distance between light beams A' and B', which correspond to the light beams A and B, i.e., a positional deviation $d_1$ of incident light is also measured. To simplify discussions, it is assumed in FIG. 34 that the light beams A, B, A' and B' are located in a plane perpendicular to the longitudinal axis of the coated optical fiber 100 and that the particular direction is perpendicular to the irradiating direction.

Referring to FIG. 34, there is described an example of a method of estimating a coating state based on the above-mentioned distances $d_1$ and $d_2$. It is assumed that the following are known parameters: a radius $r_1$ of the glass portion 100a, a radius $r_2$ of the resin portion 100b, a refractive index $n_1$ of the ambient area of the coated optical fiber 100, and a refractive index $n_2$ of the resin portion 100b.

If the center of a circle of the radius $r_2$, which represents the outer surface of the resin portion 100b, is selected as the origin $C_2$ of the x-y coordinate system, coordinates of a reflection point $P_0$ of the light beam A, an incident point $P_1$ at which the light beam B' is incident on the resin portion 100b, and an exit point $P_2$ at which the light beam B exits from the resin portion 100b are calculated as follows:

$$P_0 = (r_2/\sqrt{2}, r_2/\sqrt{2}) \quad (1)$$

$$P_1 = \left(r_2/\sqrt{2} - d_1, \sqrt{r_2^2 - (r_2/\sqrt{2} - d_1)^2}\right) \quad (2)$$

$$P_2 = \left(\sqrt{r_2^2 - (r_2/\sqrt{2} - d_2)^2}, r_2/\sqrt{2} - d_2\right). \quad (3)$$

An incident angle $\theta_1$ of the light beam B' on the resin portion 100b is calculated as equation (4) using the coordinates ($P_{1x}$, $P_{1y}$) of point $P_1$, and an exit angle $\theta_3$ of the light beam B is calculated as equation (5) using the coordinates ($P_{2x}$, $P_{2y}$) of point $P_2$. Further, equations (6)

and (7) describe refraction at points $P_1$ and $P_2$, respectively.

$$\theta_1 = \tan^{-1}(P_{1x}/P_{1y}) \quad (4)$$

$$\theta_3 = \tan^{-1}(P_{2y}/P_{2x}) \quad (5)$$

$$\sin\theta_2/\sin\theta_1 = n_1/n_2 \quad (6)$$

$$\sin\theta_4/\sin\theta_3 = n_1/n_2. \quad (7)$$

Equations (8) and (9) are conditions to be satisfied by coordinates $(P_{3x}, P_{3y})$ of a reflection point $P_3$ of the light beam B' on the boundary surface between the resin portion $100b$ and the glass portion $100a$.

$$P_{3y} - P_{1y} = \tan(\pi/2 - \theta_1 + \theta_2)\cdot(P_{3x} - P_{1x}) \quad (8)$$

$$P_{3y} - P_{2y} = \tan(\theta_3 - \theta_4)\cdot(P_{3x} - P_{2x}). \quad (9)$$

Solving equations (8) and (9) by substituting $\tan(\pi/2 - \theta_1 + \theta_2) = T_1$ and $\tan(\theta_3 - \theta_4) = T_2$ into the respective equations, equations (10) and (11) are obtained for the coordinates $(P_{3x}, P_{3y})$.

$$P_{3x} = (T_1 P_{1x} - P_{1y} + P_{2y} - P_{2x})/(T_1 - T_2) \quad (10)$$

$$P_{3y} = (T_1 P_{2y} - T_1 T_2 P_{2x} - T_2 P_{1y} + T_1 T_2 P_{2x})/(T_1 - T_2). \quad (11)$$

Since the center $C_1$ of the glass portion $100a$ is located on a bisector of an angle formed at the reflection point $P_3$ by the incident light and reflected light, and is spaced from $P_3$ by a distance of $r_1$, its coordinates $(C_{1x}, C_{1y})$ are expressed as follows based on equations (10) and (11).

$$C_{1x} = P_{3x} - r_1 \cos\theta_m$$
$$C_{1y} = P_{3y} - r_1 \sin\theta_m \quad (12)$$

where $$\theta_m = (\pi/2 - \theta_1 + \theta_2 + \theta_3 - \theta_4)/2.$$

Since the coordinates $(C_{1x}, C_{1y})$ of the center $C_1$ represents an eccentricity of the center of the glass portion $100a$ from the center $C_2$ of the resin portion $100b$, coating state parameters such as a degree of a thickness variation (a ratio of a minimum thickness to a maximum thickness) and its direction can be known.

While in the above description it is assumed for simplification that the coating consists of a single layer and that the reflection light beams A and B are perpendicular to the incident light beams A' and B', the coating state can be obtained in a similar manner even if the coating is constituted of multiple layers or if reflection light beams in another direction are measured.

In a usual manufacturing line of optical fibers, the outer radius $r_2$ of the resin portion $100b$ and even the refractive indices $n_1$ and $n_2$ may vary depending on the type of optical fibers. Even in such cases, the thickness variation can be detected by performing a measurement similar to the above while applying light beams to the coated optical fiber 100 from a plurality of directions. This is explained below in more detail.

Figure 35:
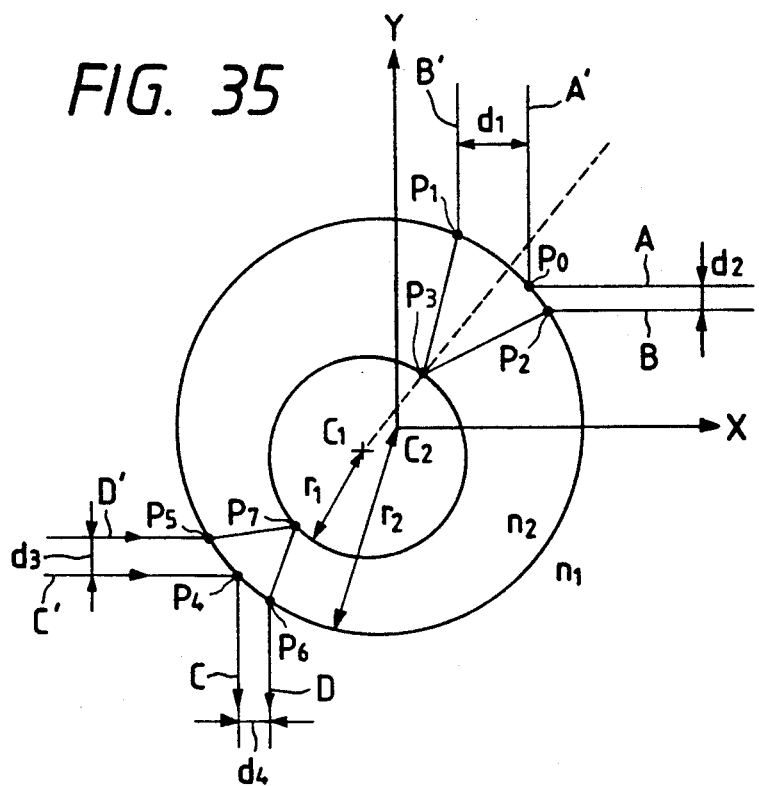
Figure 36:
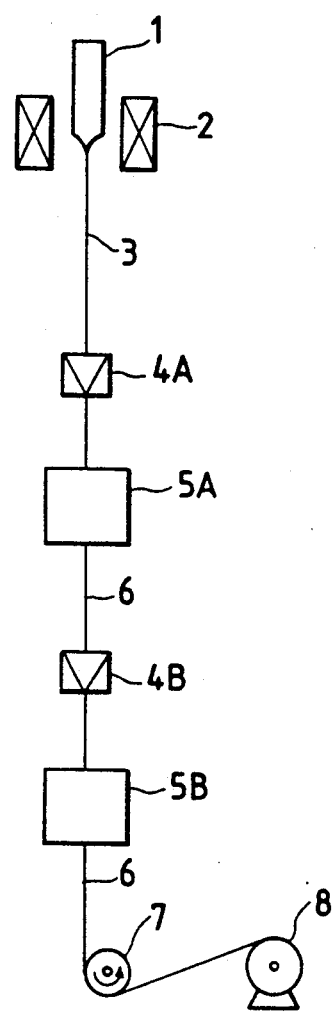
FIG. 36 shows an example of a manufacturing line of optical fibers.
Figure 37:
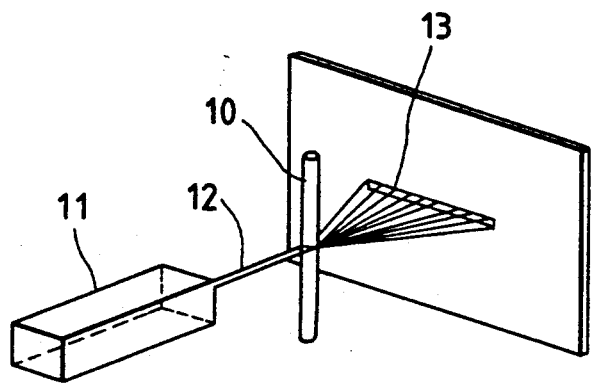
FIG. 37 shows an example of a conventional thickness variation measuring method.
Figure 38:
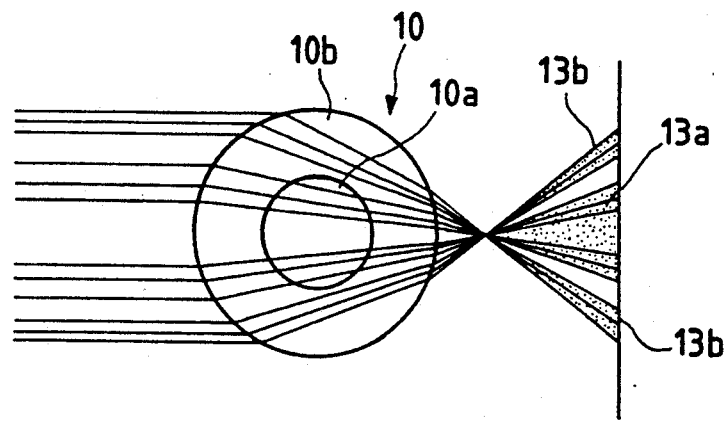
FIG. 38 illustrates the principle of the conventional thickness variation measuring method of FIG. 37.
Figure 39:
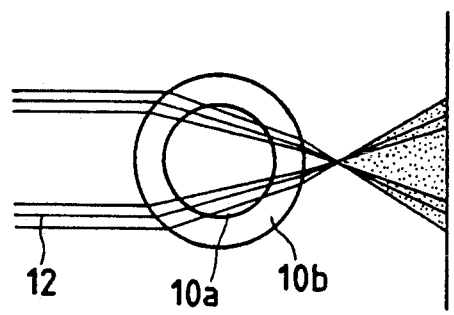
FIGS. 39 and 40 illustrate problems of the conventional thickness variation measuring method of FIG. 37.
Figure 40:
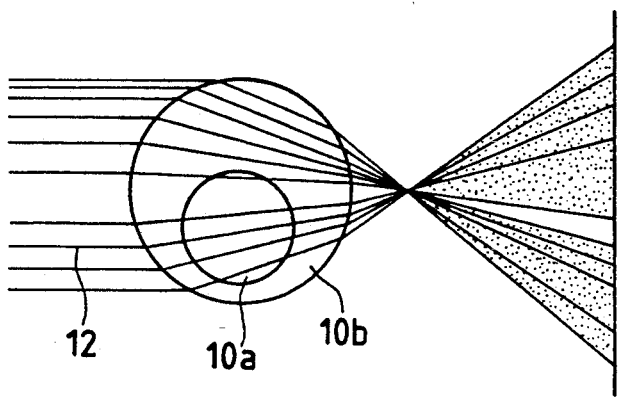

As shown in FIG. 35, in addition to measuring the distances $d_1$ and $d_2$ in the above manner, light beams C' and D' are made incident on the coated optical fiber 100 in another direction and corresponding light beams C and D reflected from the outer surface and the boundary surface, respectively, are detected, to measure a distance $d_3$ between the light beams C' and D' and a distance $d_4$ between the light beams C and D. The coating state is determined according to the following procedure.

1) Calculating the coordinates of $P_0$, $P_1$ and $P_2$ from $d_1$ and $d_2$, and the coordinates $P_4$, $P_5$ and $P_6$ from $d_3$ and $d_4$.
2) Calculating the outer radius $r_2$ and coordinates the center $C_2$ of the resin portion $100b$ from the coordinates of $P_0$ and $P_4$.
3) Expressing each coordinates of $P_3$, $P_7$ and $C_1$ by a function having $n_1$ and $n_2$ as unknown parameters.
4) For each of $P_3$ and $P_7$, establishing equations which describe conditions that $P_3$ or $P_7$ is located on a circle having the center $C_1$ and the radius $r_1$.
5) Solving the equations of the coordinates of $P_3$, $P_7$ and $C_1$ (step 3)) and the equations describing the conditions on $P_3$ and $P_7$ (step 4) to obtain the coordinates $(x, y)$ of $C_1$.
6) Estimating the coating state based on the coordinates of $C_1$ and $C_2$.

While in this example the coating state is estimated based on a pair of distances $d_1$ and $d_2$, it can be estimated based on either of those. The coating state can also be estimated based on a plurality of positional deviations $d_1$ of incident light or a plurality of positional deviations $d_2$ of reflection light that are determined by inputting measuring light in one direction and detecting reflection light beams in a plurality of particular directions. Further, the coating state can be measured more precisely if a plurality of pairs of $d_1$ and $d_2$ are determined by inputting measuring light beams in a plurality of directions and detecting reflection light beams in a plurality of particular directions.

Embodiments of the invention are described hereinafter with reference to the accompanying drawings.

Figure 1:
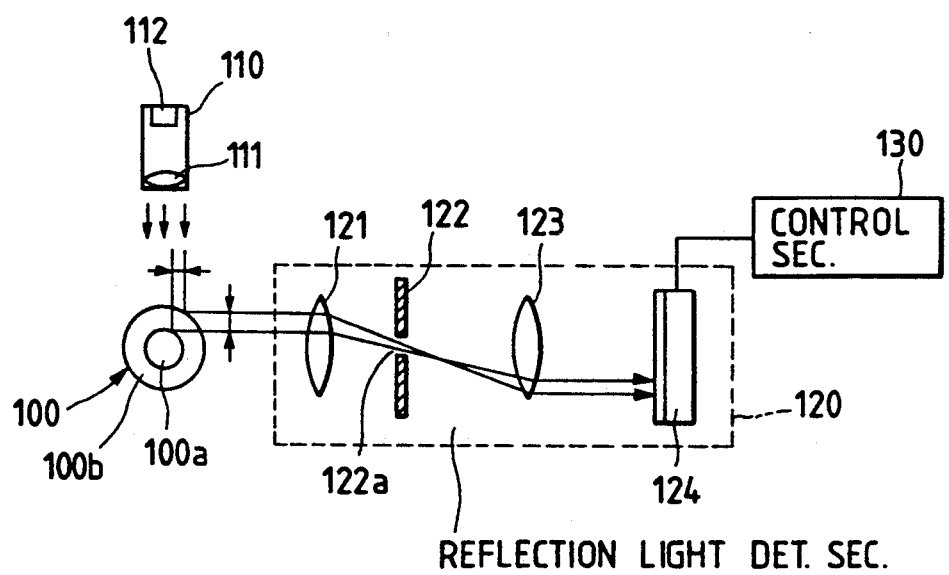
FIG. 1 conceptually shows a coating state measuring apparatus according to an embodiment of the present invention.

FIG. 1 conceptually shows a coating state measuring apparatus according to a first embodiment of the invention. As shown, a coated optical fiber 100 as an example of an object linear body is assumed to consist of a glass portion $100a$ and a resin portion $100b$. A parallel light emitting section 110 for emitting substantially parallel light and a reflection light detecting section 120 are laterally spaced from the sides of the coated optical fiber 100.

The parallel light emitting section 110 includes a collimator lens 111 opposed to a side surface of the coated optical fiber 100 and having an optical axis perpendicular to the longitudinal direction of the coated optical fiber 100, and a light source 112 disposed behind the collimator lens 111, and irradiates the side surface of the coated optical fiber 100 with the parallel light.

On the other hand, the reflection light detecting section 120 includes a condenser lens 121 opposed to a side surface of the coated optical fiber 100 and having an optical axis perpendicular to the longitudinal direction of the coated optical fiber 100 and the optical axis of the collimator lens 111, a pinhole member 122 having a pinhole $122a$ at a focal point of the condenser lens 121, a collimator lens 123 disposed behind the pinhole member 122 such that its focal point is located at the pinhole $122a$, and an image sensor 124 disposed behind the collimator lens 123 for detecting light that has passed through the pinhole $122a$ and the collimator lens 123, so that the image sensor 124 detects only part of the reflection light that is in parallel with the optical axis of the collimator lens 121. A control section 130 determines a positional deviation of the reflection light by processing data from the image sensor 124.

The apparatus of FIG. 1 is equipped with the collimator lens 121 and pinhole member 122 to selectively detect the light beams reflected by the outer surface and the boundary surface and going along a particular direction, and can perform coating state measurement with relatively simpler construction.

In the embodiment, the image sensor 124 is specifically a solid-state image pickup device which receives light incident on an array of MOS transistors or CCD memories and converts the light into an electrical signal by electronically scanning outputs of the respective cells. Further, the pinhole member 122 may be replaced by a member having a slit.

The thickness variation measurement by the apparatus of FIG. 1 is now described.

When the coated optical fiber 100 is irradiated with the parallel light from the parallel light emitting section 110, the light beam A reflected by the outer surface of the resin portion 100b and the light beam B reflected by the boundary surface between the resin portion 100b and the glass portion 100a are selectively detected by the image sensor 124; that is, no other light beams are detected. Therefore, the distance $d_2$ between the light beams A and B is determined from detecting positions of those beams A and B. The distance $d_1$ between the incident light beams A' and B', which respectively correspond to the light beams A and B, is necessary to determine the coating state, and can be determined in the similar manner by inputting light such that it travels in the direction reverse to the above. The coating state is estimated in the manner described above based on $d_1$ and $d_2$ (details are omitted here).

Figure 2:
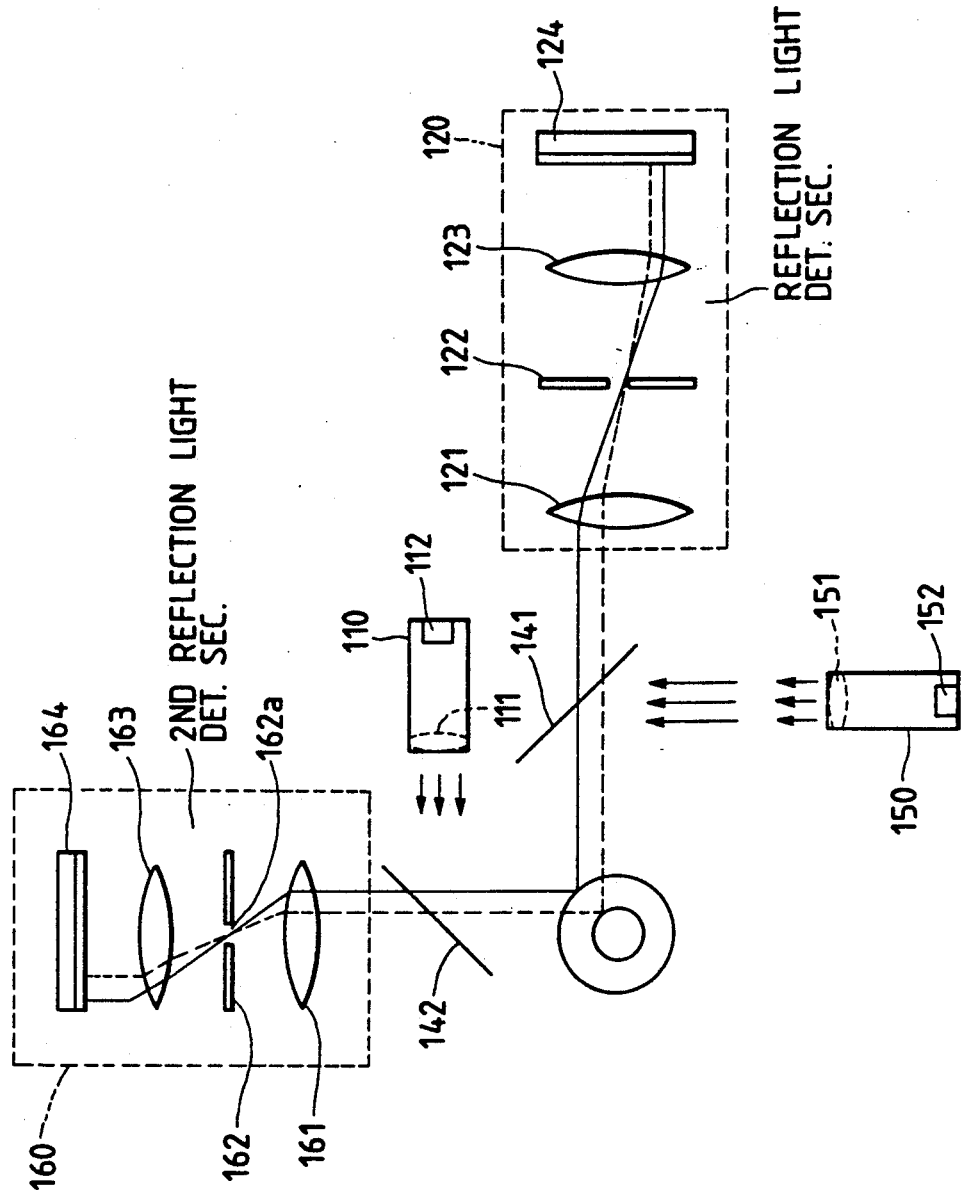
FIG. 2 conceptually shows a coating state measuring apparatus according to another embodiment of the present invention.

FIG. 2 shows a coating state measuring apparatus according to another embodiment of the present invention, which can measure the positional deviation of the reflection light (i.e., distance $d_2$ between the light beams A and B) and the positional deviation of the incident light (i.e., distance d between the light beams A' and B') at the same time. A second parallel light emitting section 150 is disposed on the side of the reflection light detecting section 120 and coupled to the optical system via a beam splitter 141. A second reflection light detecting section 160 is disposed on the side of the parallel light emitting section 110 and coupled to the optical system via a beam splitter 142. The second parallel light emitting section 150 includes a collimator lens 151 and a light source 152 disposed behind the collimator 151, and irradiates the coated optical fiber 100 with parallel light that travels in the direction opposite to the light beams A and B, as mentioned above. The second reflection light detecting section 160 is a means for detecting reflection light traveling in the direction opposite to the incident light beams A' and B', and includes a condenser lens 161, a pinhole member 162 having a pinhole 162a at a focal point of the condenser lens 161, a collimator lens 163 disposed behind the pinhole member 162 and having a focal point at the pinhole 162a for collimating the reflection light passing through the pinhole 162a, and an image sensor 164 for detecting the light passing through the pinhole 162a and the collimator lens 163. A control section may be constituted correspondingly to that of FIG. 1.

In the coating state measuring apparatus of FIG. 2, since the coating state is estimated in the similar manner as described in connection with the apparatus of FIG. 1, a detailed description is omitted here. According to the apparatus of FIG. 2, the distance $d_1$ between the incident light beams A' and B' and the distance $d_2$ between the reflection light beams A and B can be measured at the same time.

Figure 3:
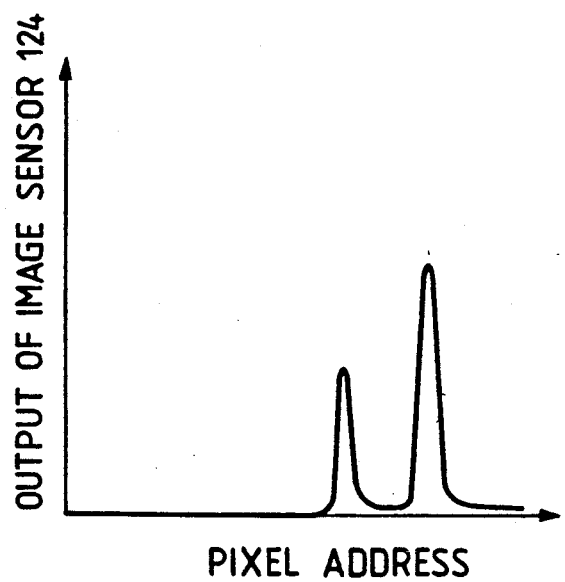
FIG. 3 shows peaks appearing in an output signal of an image sensor used in the apparatus of FIG. 2.
Figure 4:
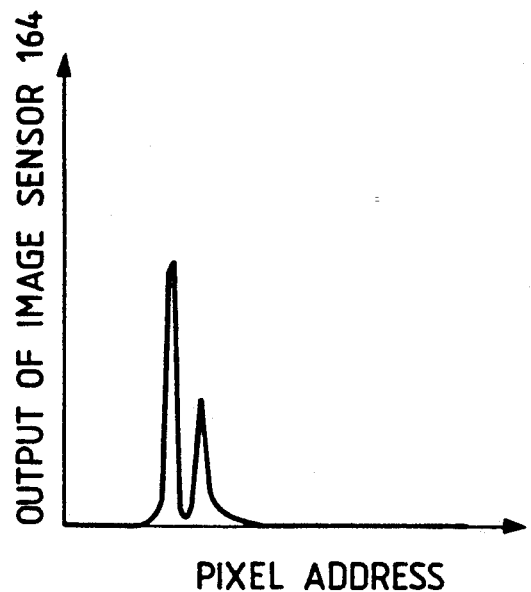
FIG. 4 shows peaks appearing in an output signal of another image sensor used in the apparatus of FIG. 2.

Each of the distances $d_1$ and $d_2$ is calculated from a positional relationship between peaks of the output of the image sensor 124 or 164 (see FIGS. 3 and 4). The coating state can be estimated based on d and dz thus calculated in the manner as described above.

Following are examples of measurements in which $d_1$ and $d_2$ of actual coated optical fibers ($r_1 = 125/2$ μm, $r_2 = 170/2$ μm) having a thickness variation were measured.

MEASUREMENT EXAMPLE 1

Figure 5:
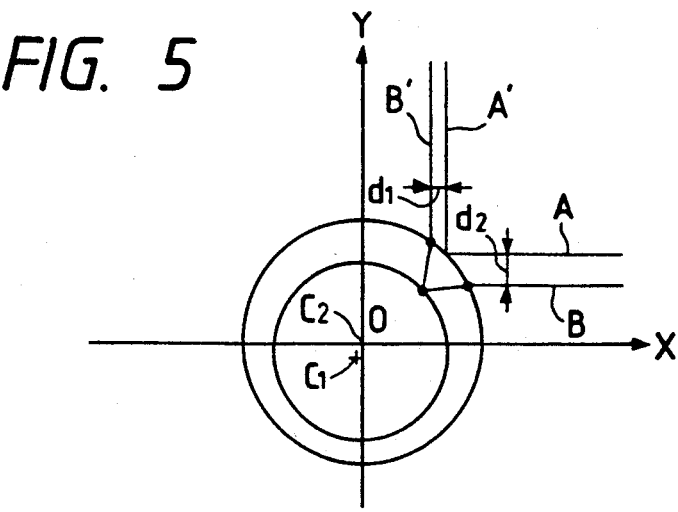
FIGS. 5-7 show examples of coated optical fibers that were subjected to measurements by the apparatus of FIG. 2.

In a coated optical fiber whose coating state is illustrated in FIG. 5, $d_1$ and $d_2$ were measured as 10 μm and 20 μm, respectively, and coordinates of $C_1$ were calculated as ($-1.732294$, $-7.68612$).

MEASUREMENT EXAMPLE 2

Figure 6:
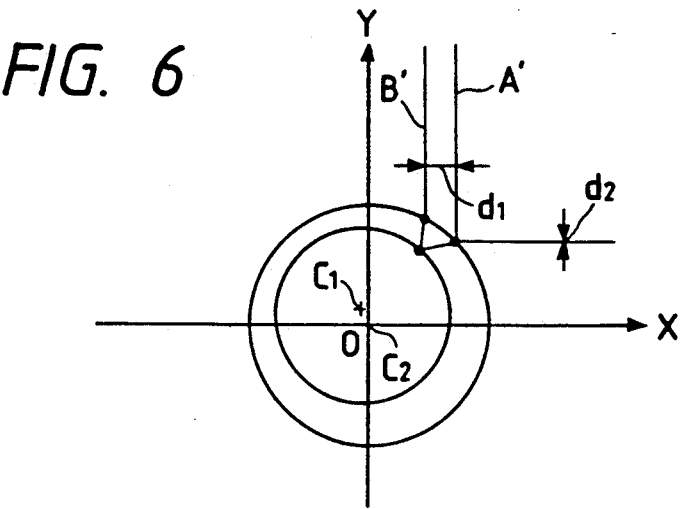

In a coated optical fiber whose coating state is illustrated in FIG. 6, $d_1$ and $d_2$ were measured as 20 μm and 0 μm, respectively, and coordinates of $C_1$ were calculated as ($-4.73828$, $7.53631$).

MEASUREMENT EXAMPLE 3

Figure 7:
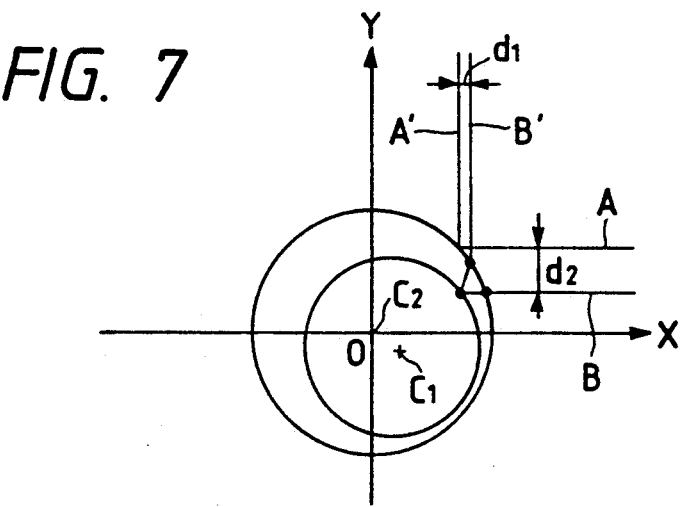

In a coated optical fiber whose coating state is illustrated in FIG. 7, $d_1$ and $d_2$ were measured as $-10$ μm and 30 μm, respectively, and coordinates of $C_1$ were calculated as ($14.0952$, $-10.3847$).

Although the apparatus of FIG. 1 employs the collimator lens 123 between the pinhole member 122 and the image sensor 24, the collimator lens 123 is not always necessary.

If two sets or more of the apparatuses as described above are used, the thickness variation can be measured even in the case where the outer radius $r_2$ and refractive index $n_2$ of the resin portion 100b and the refractive index $n_1$ of the ambient area are not known.

Where the output light is not properly be detected by the image sensor because of a large difference between the reflectivity of the outer surface of the resin portion 100b and that of the boundary surface between the resin portion 100b and the glass portion 100a, it is preferable that a refractive index matching agent be provided around the coated optical fiber 100 to reduce the difference in reflectivity.

Figure 8:
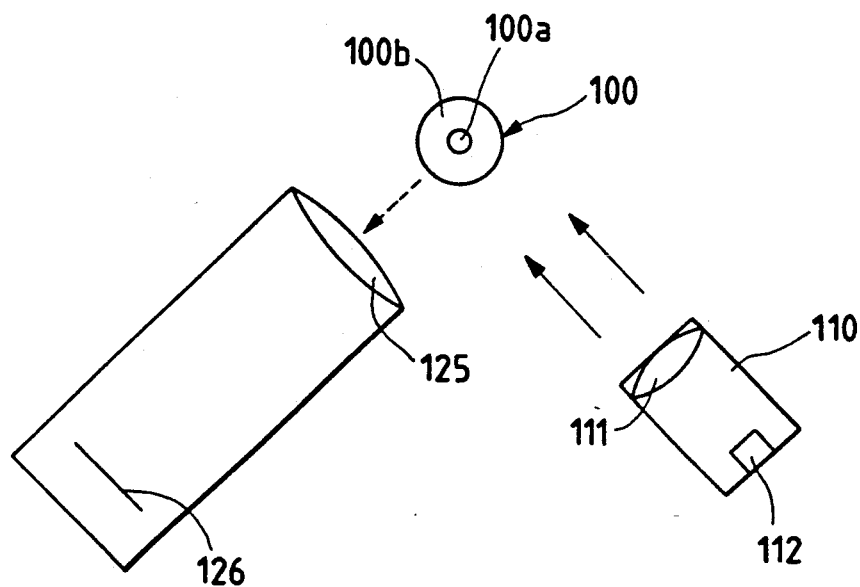
FIG. 8 shows a detection system according to another embodiment of the present invention.
Figure 9:
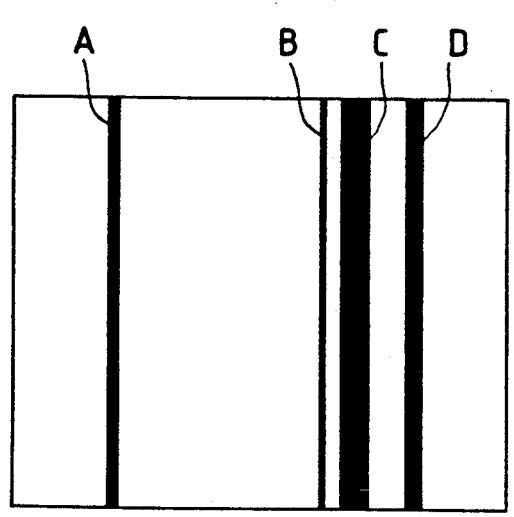
FIG. 9 is an example of a picture appearing on a TV monitor when the detection system of FIG. 8 is used.
Figure 10:
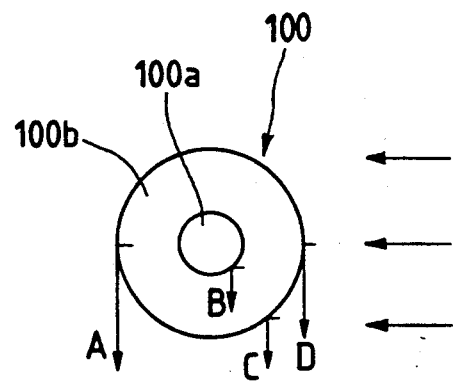
FIG. 10 shows reflection light beams in connection with FIG. 9.

Although in the apparatus of FIG. 1 the condenser lens 121 and the pinhole member 122 are employed to selectively receive only the light beams reflected from the outer surface and the boundary surface to a particular direction, a detection system consisting of a light-receiving lens and an image pickup device may be used instead of the above components 121 and 122 FIG. 8 shows such an embodiment of the present invention in which a detection system consisting of a light-receiving lens 125 and a CCD image pickup device 126 is employed. FIG. 9 is an example of a picture appearing on a TV monitor when it receives an output of the CCD image pickup device 126. In this figure, lines A-D result from reflection light beams A-D shown in FIG. 10. Therefore, a distance between the lines B and C corresponds to the positional deviation $d_2$ of the reflection light.

Figure 11:
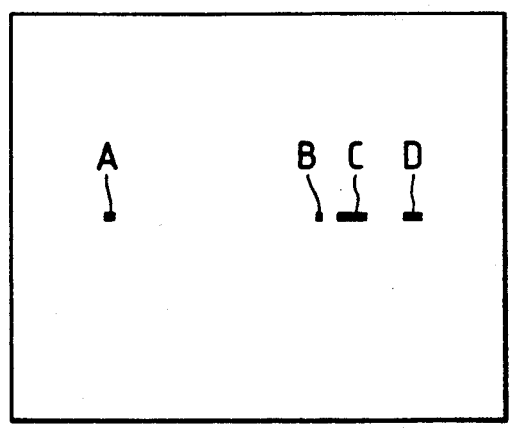
FIG. 11 shows an example of a picture appearing on the TV monitor when the detection system of FIG. 8 is used and slit light is employed as measuring light.

In the apparatuses of FIGS. 1 and 8, the parallel light as the measuring light may be replaced by slit light that is wide in a direction crossing the longitudinal axis of the coated optical fiber 100. Such slit light is generated by a slit light generating means such as a slit member, a cylindrical lens or a prism. FIG. 11 shows an example of a measurement result of a case in which the parallel incident light of the apparatus of FIG. 8 is replaced by the slit light. Lines and dots A-D in FIG. 11 result from the reflection light beams A-D in FIG. 10.

Figure 12:
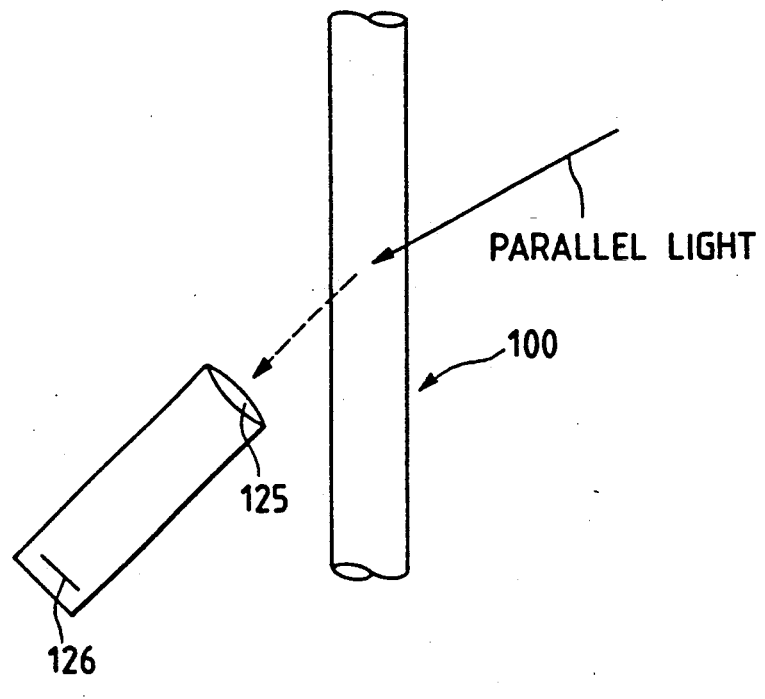
FIG. 12 illustrates inclined incidence of parallel light.
Figure 13:
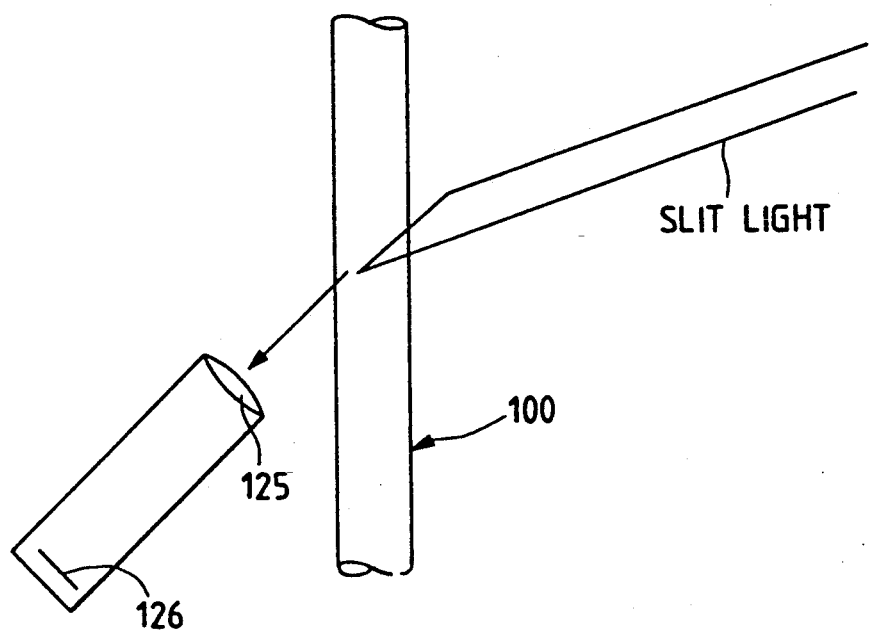
FIG. 13 illustrates inclined incidence of the slit light.

Further, in the above apparatuses, the parallel light or slit light may be input to the coated optical fiber 100 along a direction that is inclined with respect to a plane perpendicular to the longitudinal axis of the coated optical fiber 100. FIGS. 12 and 13 illustrate embodiments having such an arrangement.

In the embodiment of FIG. 12, since the image pickup optical system is inclined to a section perpendicular to the longitudinal direction of the coated optical fiber 100, the focusing point in the image pickup optical system varies depending on the position of the coated optical fiber 100 in its longitudinal direction. Therefore, this arrangement has an advantage that even if the coated optical fiber is under a wiredrawing operation and is making a tremor, focusing is obtained at some position in the vertical direction in a picture of the TV monitor as shown in FIG. 8.

Figure 14:
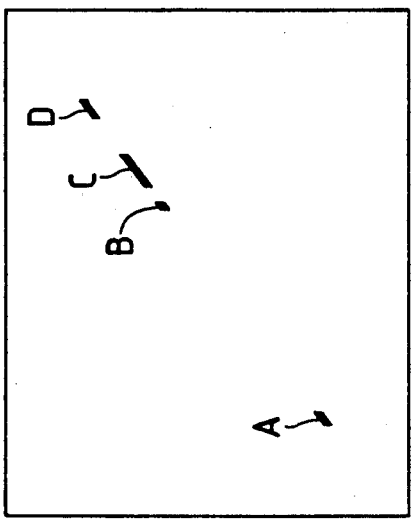
FIG. 14 shows an example of a picture produced as a result of measurement using the slit light of FIG. 13.

In the embodiment of FIG. 13 in which the slit light is input in a slanted manner, a measurement result (i.e., a picture) as shown in FIG. 14 is obtained. In this case, the distance between the lines (dots) B and C of the reflection light beams is larger than the case of FIG. 10, so that they can be separated more easily and measurement accuracy will be improved.

Figure 15:
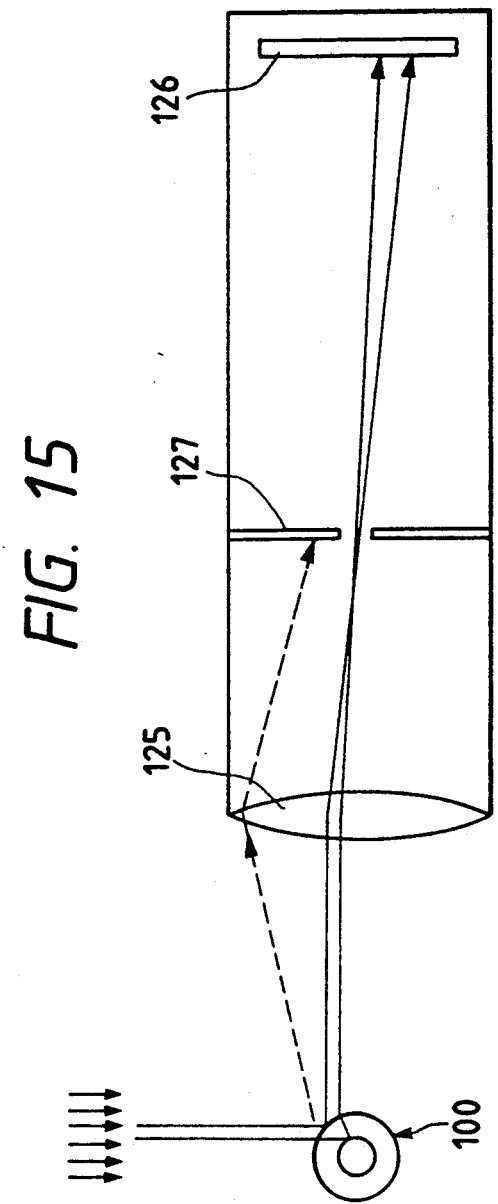
FIG. 15 shows an embodiment in which a diaphragm member is employed in the detection system.

In the apparatuses of FIGS. 8, 12 and 13, the reflection light (i.e., light to be measured) can be detected more easily by restricting the light-receiving numerical aperture of the detection optical system to increase the depth of focus and to restrict the angular range of the reflection light reaching the CCD image pickup device 126. More specifically, as shown in FIG. 15, a diaphragm member 127 may be disposed between the light-receiving lens 125 and the CCD image pickup device 126. With this structure, a peripheral part (e.g., a beam shown by the dashed line in FIG. 15) of the light reflected from the surface of the cylindrical coated optical fiber 100 is removed by the diaphragm member 127 and only part, but including the necessary part, of the reflection light can be detected, so that the observation becomes easier. Further, since the diaphragm member 127 provides a large depth of focus, both of the light beam from the outer surface of the coated optical fiber 100 and the light beam from the boundary surface between the glass portion 100a and the resin portion 100b can be focused more easily, and the observation can readily be performed even if the coated optical fiber 100 has some positional fluctuation.

Figure 16:
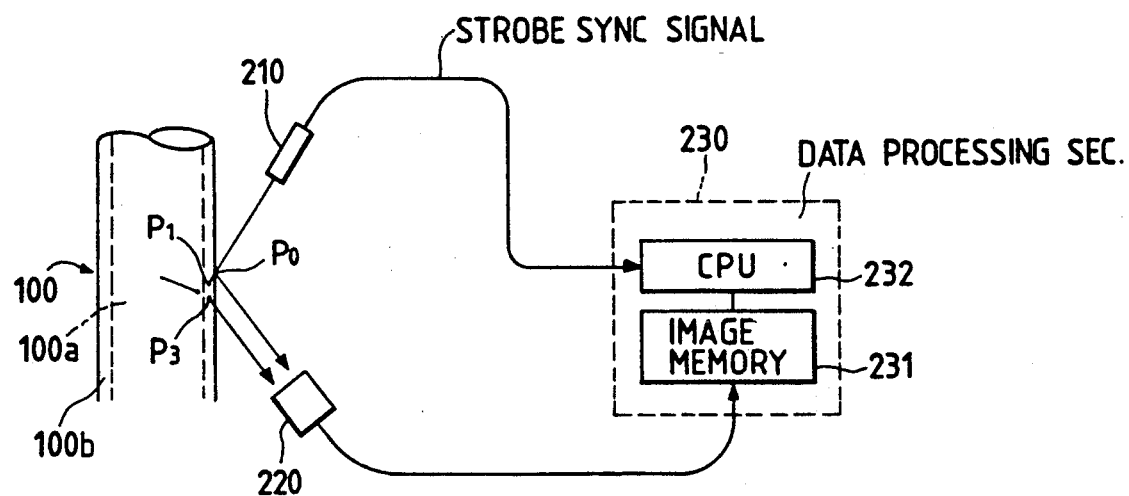
FIG. 16 shows a configuration of a coating state measuring apparatus according to an embodiment of the present invention, which employs slit light.

FIG. 16 conceptually shows an embodiment of a coating state measuring apparatus which also employs slit light. As shown, a coated optical fiber 100 as an example of an object linear body is assumed to consist of a glass portion 100a and a resin portion 100b, and a slit light emitting section 210 and a reflection light detecting section 220 are laterally spaced from the coated optical fiber 100. The slit light emitting section 210 has a laser light source or a light-emitting diode, and emits slit light traveling in a plane that is inclined to a plane perpendicular to the longitudinal direction of the coated optical fiber 100 and that is perpendicular to the paper surface of FIG. 16. The slit light is in the form of strobe light, and is made incident on a side surface of the coated optical fiber 100. The reflection light detecting section 220 for detecting the slit light reflected from the coated optical fiber 100 is disposed so as to be located in a plane defined by the center of the slit light emitting section 210 and the axis of the coated optical fiber 100. In this embodiment, the reflection light detecting section 220 has a two-dimensional image sensor. A data processing section 230 for processing data from the slit light emitting section 210 and the reflection light detecting section 220 and for estimating the coating state, consists of an image memory 231 for storing image data read from the reflection light detecting section 220, and a CPU 232 for estimating the coating state by performing data processing while receiving the image data from the image memory 231 and a strobe sync signal from the slit light emitting section 210.

The principle of the coating state measurement by the apparatus of FIG. 16 is now described.

Figure 17:
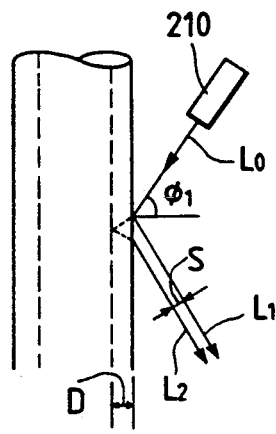
FIGS. 17-19 illustrate the principle of measurement performed by the apparatus of FIG. 16.

As shown in FIG. 17, in the case where the coated optical fiber 100 has no thickness variation, when a light beam $L_0$ of the slit light which is directed to the center of the coated optical fiber 100 is input at an incident angle $\phi_1$, there are produced a light beam $L_1$ as a result of reflection by the outer surface of the resin portion 100b and a light beam $L_2$ as a result of reflection by the boundary between the resin portion 100b and the glass portion 100a. Since a distance S between the light beams $L_1$ and $L_2$ and a thickness D has a relationship of equation (13), the thickness D can be determined by measuring the distance S.

$$D = S \sqrt{n_2^2 - \sin^2\phi_1} / 2\sin\phi_1\cos\phi_1 \tag{13}$$

where $n_2$ is a refractive index of the resin portion 100b.

Figure 18:
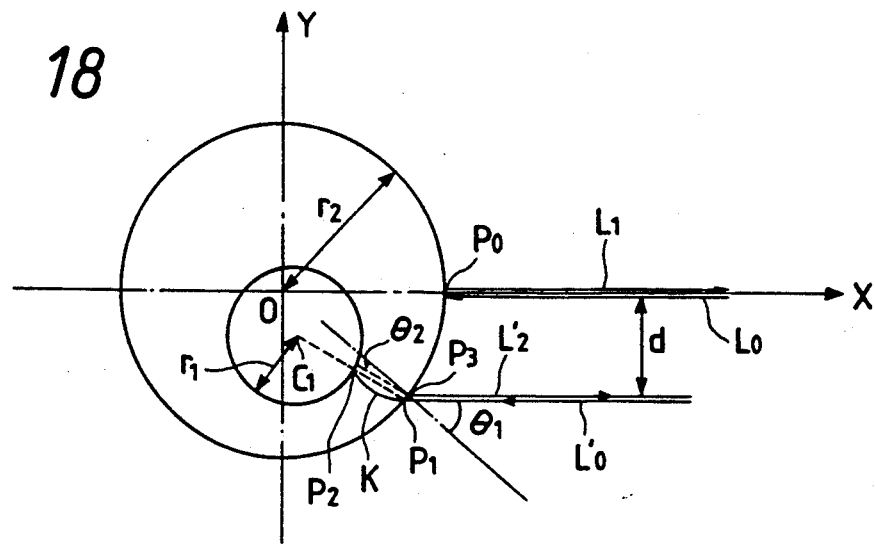
Figure 19:
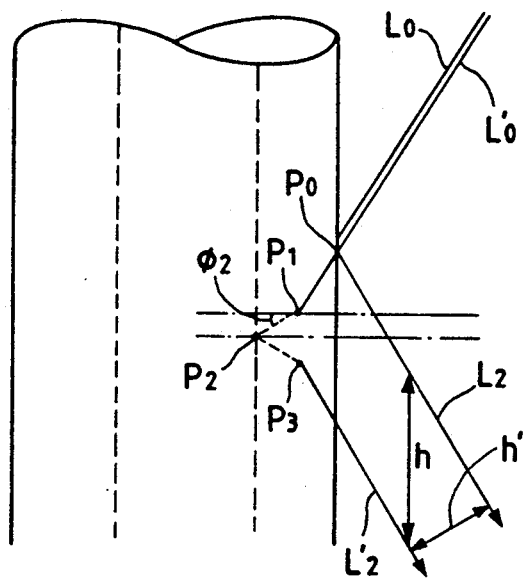

But where there exists some thickness variation, the light beam $L_2$ does not travel in parallel with the light beam $L_1$, but, as shown in FIGS. 18 and 19, a light beam $L_0'$ that is deviated from the light beam $L_0$ to the direction of an eccentricity of the glass portion 100b is input to the resin portion 100b at point $P_1$, travels toward the center of the glass portion 100a, is reflected at point $P_2$ on the boundary surface, and is finally output from point $P_3$ as a light beam $L_2'$ that travels in parallel with the light beam $L_1$.

Assuming that an incident angle of the light beam $L_0'$ within a plane perpendicular to the center axis is represented by $\theta_1$, its refraction angle by $\theta_2$, a distance between $P_1$ and $P_2$ within the same plane by k, a distance d between the light beams $L_0$ and $L_0'$ by d, and an outer radius of the resin portion 100b by $r_2$, coordinates of $P_1$ and $P_2$ in FIG. 18 are given as follows.

$$P_1 = (\sqrt{r_2^2 - d^2}, -d) \tag{14}$$

$$P_2 = (\sqrt{r_2^2 - d^2} + k \cdot \cos(\theta_1 - \theta_2), -d + k \cdot \sin(\theta_1 - \theta_2)). \tag{15}$$

If an incident angle and a refraction angle of the light beam $L_0'$ at $P_1$ within the plane including $P_1$ and $P_2$ and in parallel with the center axis are respectively represented by $\phi_1$ and $\phi_2$, a distance h between the reflection light beams $L_2$ and $L_2'$ is expressed as equation (16).

$$h = (r_2 - \sqrt{r_2^2 - d^2})\tan\phi_1 + 2k \cdot \tan\phi_2. \tag{16}$$

Rearranging equation (16), we obtain an expression for k as follows.

$$k = \{h - (r_2 - \sqrt{r_2^2 - d^2})\tan\phi_1\}/2\tan\phi_2. \quad (17)$$

Since the center $C_1$ of the glass portion 100a (see FIG. 18) is spaced from $P_1$ in the radial direction by $(r_1+k)$ where is a radius of the glass portion 100a, its coordinates $(C_{1x}, C_{1y})$ are given by equations (18). In the apparatus of FIG. 16, the coating state can be estimated by detecting the distances h and d.

$$C_{1x}=P_{1x}-(k+r_1)\cos(\theta_1-\theta_2)$$

$$C_{1y}=P_{1y}-(k+r_1)\sin(\theta_1-\theta_2). \quad (18)$$

In order to determine the distances h and d in the apparatus of FIG. 16, the data of the reflection light, which is obtained by the image sensor of the reflection light detecting section 220, is subjected to a process for correcting for factors such as refraction in the resin portion 100b.

Although for simplification it is assumed in the above description that the coating consists of a single coating layer, the coating state in the case of multiple coating layers can also be determined in the similar manner.

Actual measurement of the coating state of the coated optical fiber 100 is performed by the coating state measuring apparatus of FIG. 16 in the following manner. While the coated optical fiber 100 is irradiated with the strobe-light-like slit light emitted from the slit light emitting section 210, the reflection light is detected by the reflection light detecting section 220. The distances d and h are determined by the CPU 132 which processes the data written in the image memory 131. The coating state is estimated based on d and h thus determined.

Figure 20:
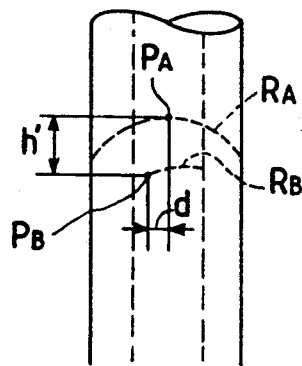
FIG. 20 illustrates a result of the measurement performed by the apparatus of FIG. 16.

FIG. 20 shows two circular-arc-like reflecting lines $R_A$ and $R_B$ to be observed actually. The reflecting line $R_A$ is a collection of reflecting points on the outer surface of the resin portion 100b, and its center point $P_A$ should coincide with $P_0$. The reflecting line $R_B$ on the outer surface of the resin portion 100b corresponds to a collection of reflecting points on the boundary surface, and a point $P_B$ appears on the reflection line $R_B$. The position of the above-described point $P_3$ is determined from the position of $P_B$ by correcting it for factors such as refraction in the resin portion 100b. In a simplified measurement, the position of $P_B$ may be regarded as that of $P_3$. A vertical distance and a horizontal distance between $P_A$ and $P_B$ correspond to a distance h' in FIG. 19 and the distance d in FIG. 18, respectively. The coating state can be estimated in the above-described manner based on the distances h' (h) and d.

If two sets of the above apparatuses are used, the thickness variation can be measured even if the outer radius $r_2$ and the refractive index $n_2$ of the resin portion 100b and the refractive index $n_1$ of the ambient area are unknown.

Where the output light is not properly detected by the reflection light detecting section 220 because of a large difference between the reflectivity of the outer surface of the resin portion 100b and that of the boundary surface between the resin portion 100b and the glass portion 100a, it is preferably that a refractive index matching agent be provided around the coated optical fiber 100 to reduce the difference in reflectivity.

In the apparatus of FIG. 16, the data processing in the data processing section 230 is performed in synchronism with emission of the strobe-light-like slit light from the slit light emitting section 210. By virtue of this operation, the measurement can be performed in a positive manner even if the coated optical fiber 100 is vibrating in its lateral direction. It is apparent that this technique can also be applied to all of the apparatuses of the other embodiments of the present invention.

Next an embodiment is described which utilizes laser scanning light as the measuring light.

Figure 21:
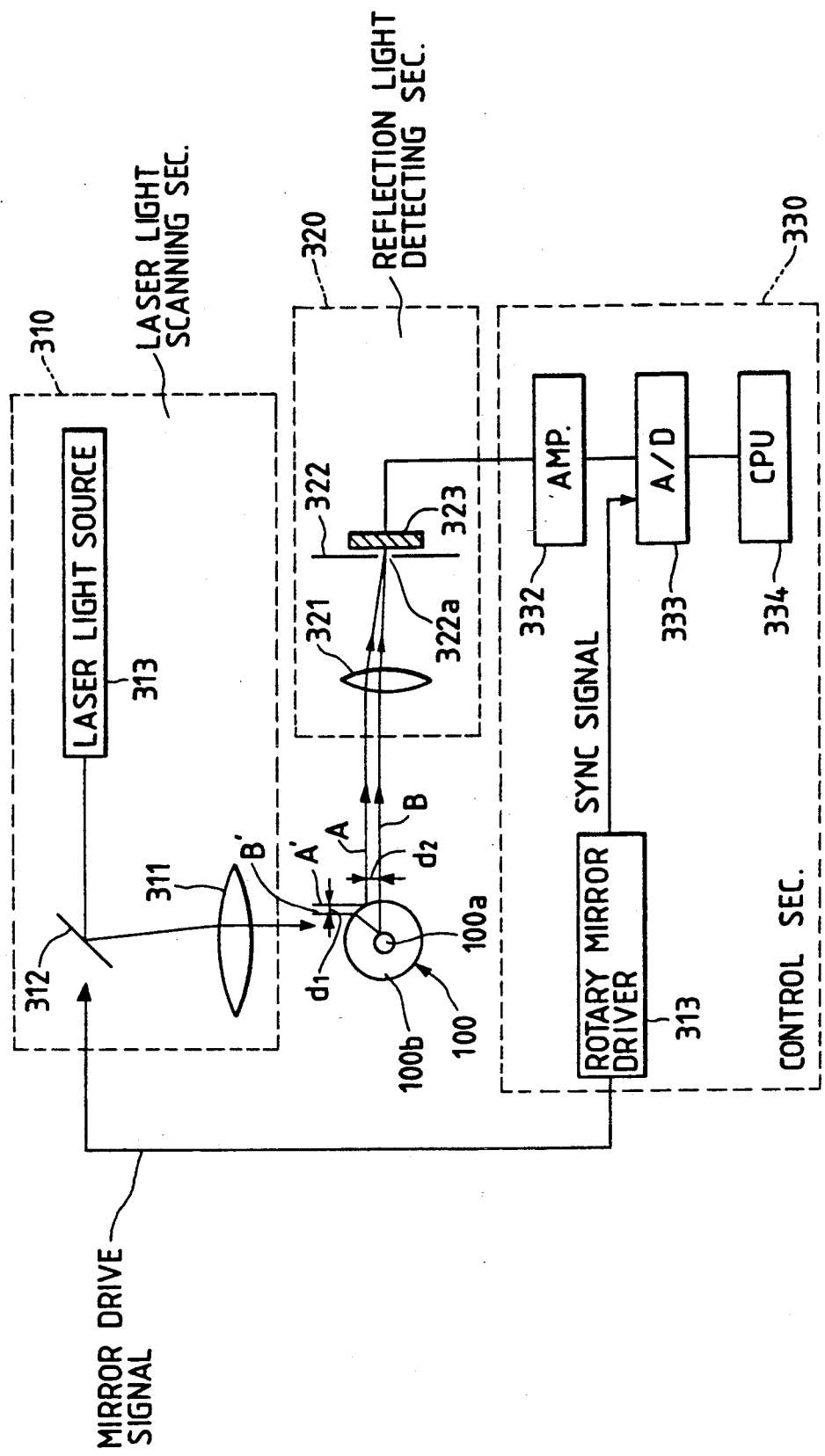
FIG. 21 shows a configuration of a coating, state measuring apparatus according to an embodiment of the present invention which employs laser light scanning.

FIG. 21 conceptually shows an example of a coating state measuring apparatus which employs laser scanning light. As shown, a coated optical fiber 100 as an example of an object linear body is assumed to consist of a glass portion 100a and a resin portion 100b, and a laser light scanning section 310 and a reflection light detecting section 320 are laterally spaced from the coated optical fiber 100. The laser light scanning section 310 includes a collimator lens 311 opposed to a side surface of the coated optical fiber 100 and having an optical axis perpendicular to the longitudinal direction of the coated optical fiber 100, a rotary mirror 312 provided at a focal point of the collimator lens and having a rotation axis passing through that focal point and being in parallel with the longitudinal direction of the coated optical fiber 100, and a laser light source 313 for irradiating a rotation center area of the rotary mirror 312. A plane perpendicular to the longitudinal direction of the coated optical fiber 100 is made a scanning plane of the laser light. The reflection light detecting section 320 includes a condenser lens 321 opposed to a side surface of the coated optical fiber 100 and having an optical axis perpendicular both to the longitudinal direction of the coated optical fiber 100 and to the optical axis of the collimator lens 311, a slit member 322 having a slit 322a at a rear focal point of the collimator lens 321, and a photodetector 323 such as a photodiode disposed behind the slit member 32 and detecting light passing through the slit 322a, so that the reflection light detecting section 320 detects only part of the reflection light that is in parallel with the optical axis of the condenser lens 321. A control section 330 estimates the coating state by processing data provided from the laser light scanning section 310 and the reflection light detecting section 320. That is, the control section 330 includes a rotary mirror driver 331 for sending a mirror drive signal to the rotary mirror 312 and outputting a corresponding sync signal, an amplifier 332 for amplifying an output signal of the photodetector 323, an A/D converter 333 for A/D-converting the sync signal from the rotary mirror driver 323 and an amplified signal of the amplifier 332, a CPU 334 for processing a signal from the A/D converter 333 to detect a scanning position at a time point when the photodetector 323 receives the reflection light.

The apparatus of FIG. 21 uses the condenser lens 321 and the slit member 322 to selectively detect light beams reflected from the outer surface and the boundary surface to a particular direction, and has simple construction to implement the invention.

In the above apparatus, the photodetector 323 broadly includes devices that detect light and produce an electrical signal in accordance with the detected light quantity. The beam diameter of the laser light may be selected properly in connection with a desired resolution, but it should preferably be smaller than a minimum value of the coating to be measured. Further, it is apparent that the slit member 322 may be replaced by a member having a pinhole.

The thickness variation measurement by the apparatus of FIG. 21 is performed in the following manner. When a laser light beam from the laser light source 313 is moved by rotation of the rotary mirror 312 from the right to the left in FIG. 21, a light beam A reflected by the outer surface of the resin portion 100b of the coated optical fiber 100 is first detected by the photodetector 323, and then a light beam B reflected by the boundary surface between the resin portion 100b and the glass portion 100a is detected. No other reflection light beams are detected by the photodetector 323. Therefore, a distance $d_1$ in the scanning direction between incident light beams A' and B' that respectively correspond to the reflection light beams A and B is determined based on outputs when the light beams A and B are detected and the sync signal from the rotary mirror driver 331. In order to determine the coating state, it may be required to measure a distance $d_2$ between the light beams A and B. This can be done in the similar manner, for instance, by inputting light to a direction reverse to the direction of the above case. Alternatively, the distance $d_2$ may be determined by splitting each of the light beams A and B into two beams and detecting one pair (A and B) of the split beams at the same time by another detecting means, such as an image sensor, that is capable of detecting a position of detection.

A semiconductor position-sensitive device (PSD) can be used to detect the light beams reflected by the outer surface and the boundary surface. The PSD has a structure in which position signal electrodes are formed on both sides of a light incident surface of a semiconductor and a reference electrode is formed on the back side of the semiconductor, and outputs, from the respective position signal electrodes, divisional photocurrents produced in response to input light being incident on the incident surface and each having a magnitude that is in inverse proportion to a distance between the light incident position and the associated one of the position signal electrodes. The positional deviation $d_1$ of the incident light can be determined based on a relationship between time and a sum of voltages of the two position signal electrodes with respect to the reference electrode. The positional deviation $d_2$ of the reflection light can be determined based on information on the incident positions that are calculated from amplitudes of voltages of the respective position signal electrodes with respect to the reference electrode.

Figure 22:
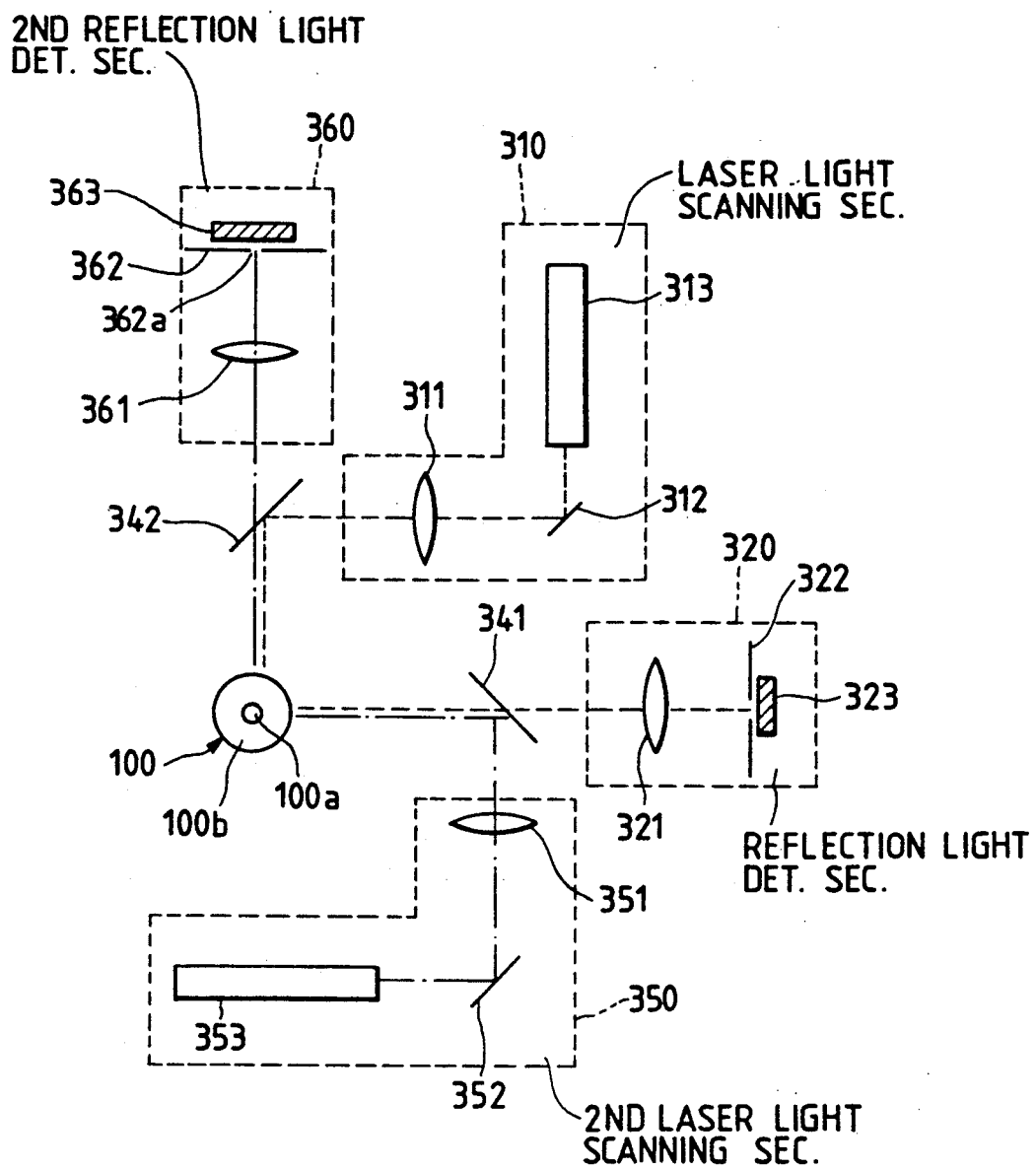
FIG. 22 shows a configuration of a coating state measuring apparatus according to another embodiment, which employs laser light scanning.

FIG. 22 conceptually shows a configuration of a coating state measuring apparatus according to another embodiment of the present invention. Components in FIG. 22 having the same function as those in FIG. 21 are represented by the same reference numerals, and a redundant description for those is omitted here. The apparatus of FIG. 22 is intended to measure both of the positional deviation of the incident light (i.e., the distance $d_1$ between the light beams A' and B') and the positional deviation of the reflection light (i.e., the distance $d_2$ between the light beams A and B), in which a second laser light scanning section 350 is disposed on the side of the reflection light detecting section 320 and coupled to the optical system via a beam splitter 341, and a second reflection light detecting section 360 is disposed on the side of the laser light scanning section 310 and coupled to the optical system via a beam splitter 342. The second laser light scanning section 350 works to scan the coated optical fiber 100 with the laser light as mentioned above that travels to the direction reverse to that of the reflection light beams A and B, and includes a collimator lens 351 opposed to the beam splitter 341, a rotary mirror 352 disposed at a focal point of the collimator lens 351, and a laser light source 353 for emitting laser light to be input to the rotary mirror 352. The second reflection light detecting section 360 detects the laser light as mentioned above that travels to the direction reverse to that of the incident light beams A' and B', and includes a condenser lens 361 opposed to the beam splitter 342, a slit member 362 having a slit 362a positioned at a focal point of the condenser lens 361, and a photodetector 363 disposed behind the slit member 362 for detecting the light passing through the slit 362a. A control section may be constructed correspondingly to the apparatus of FIG. 21.

Figure 23:
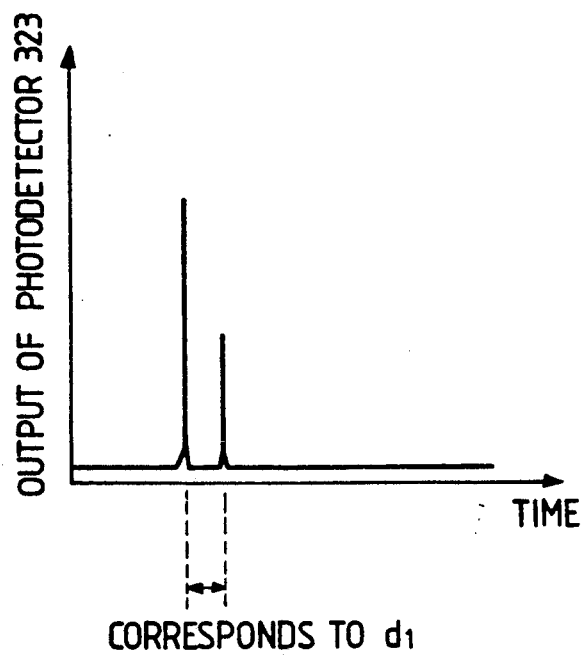
FIGS. 23 and 24 show output signals of photodetectors used in the apparatus of FIG. 22.
Figure 24:
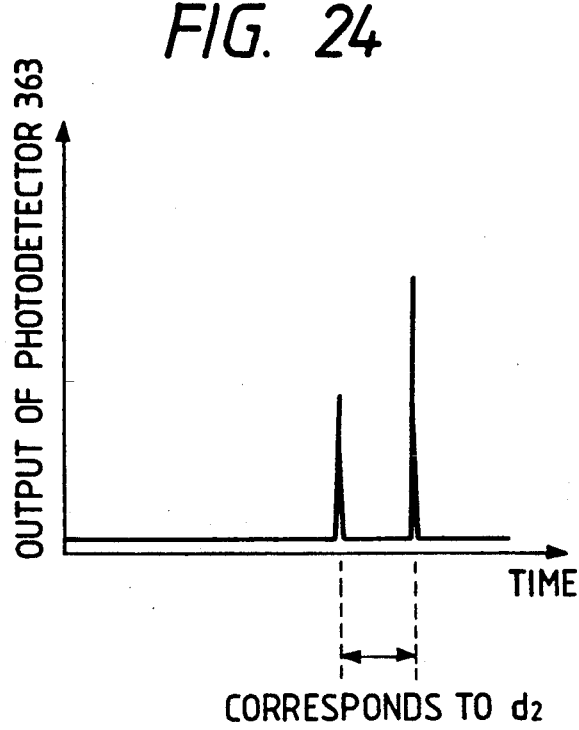

Since the coating state measurement by this apparatus is similar to that by the apparatus of FIG. 21, a description for its measurement operation is omitted here. The apparatus of FIG. 22 can measure the distance $d_1$ between the incident light beams A' and B' and the distance $d_2$ between the reflection light beams A and B at the same time. More specifically, as shown in FIGS. 23 and 24, the distance $d_1$ can be calculated based on a relationship between a scanning sync signal and a time difference between peaks of an output of the photodetector 323, and the distance $d_2$ based on a relationship between a scanning sync signal and a time difference between peaks of an output of the photodetector 363. Using the distances $d_1$ and $d_2$, the coating state can be estimated in the manner as described above.

If two sets or more of the above apparatuses are provided, the coating state can be determined even if the outer radius $r_2$, refractive index $n_2$ of the resin portion 100b, and refractive index $n_1$ of the ambient area are unknown.

Where the output light is not properly be detected by the photodetector because of a large difference between the reflectivity of the outer surface of the resin portion 100b and that of the boundary surface between the resin portion 100b and the glass portion 100a, it is preferable that a refractive index matching agent be provided around the coated optical fiber 100 to reduce the difference in reflectivity.

Figure 25:
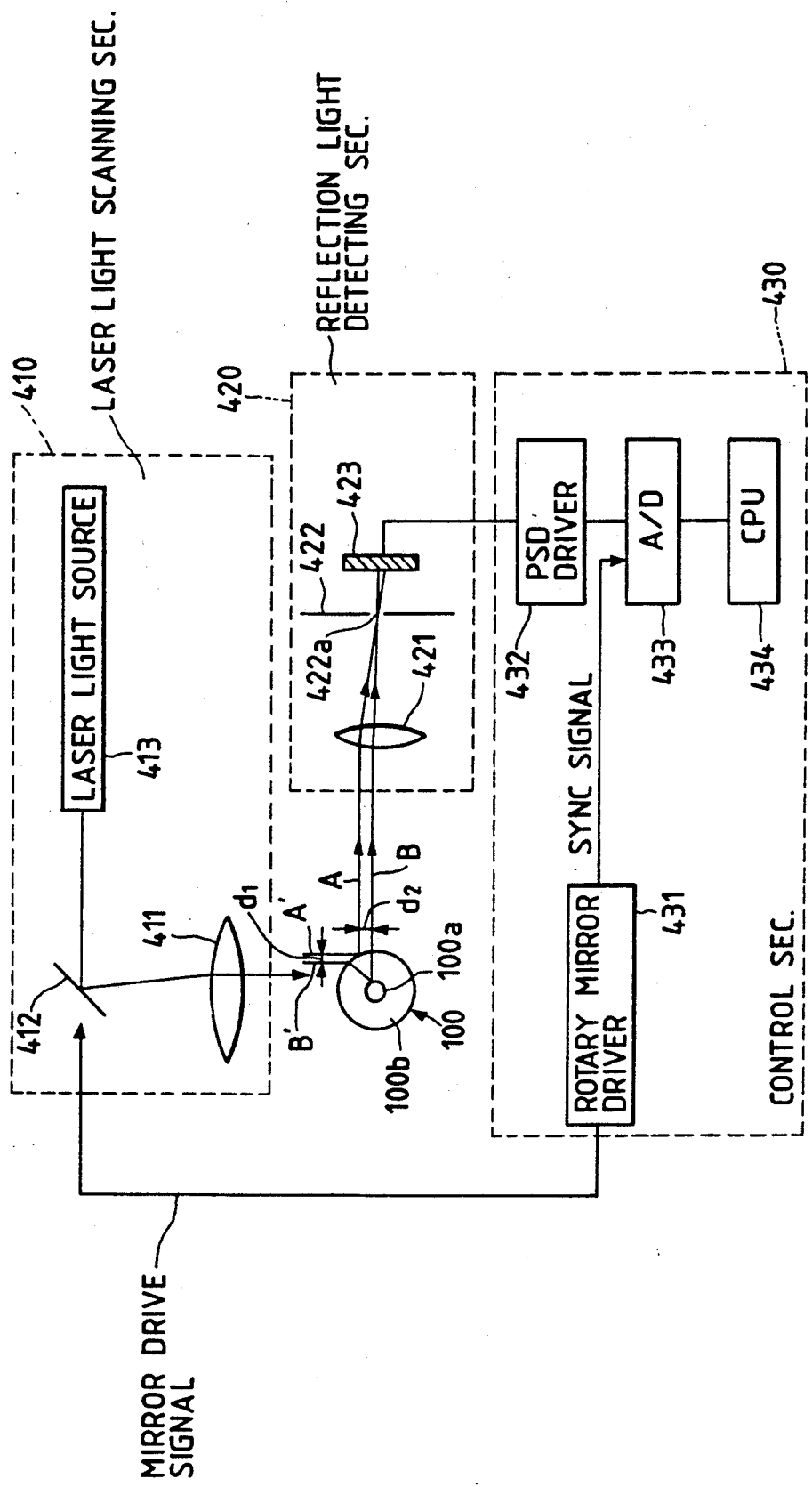
FIG. 25 shows a coating state measuring apparatus, according to another embodiment of the present invention, which employs laser light scanning.

FIG. 25 conceptually shows another coating state measuring apparatus employing laser scanning light. As shown, a laser light scanning section 410 and a reflection light detecting section 420 are laterally spaced from a coated optical fiber 100 as an example of an object linear body. The laser light scanning section 410 includes a collimator lens 411 opposed to a side surface of the coated optical fiber 100 and having an optical axis perpendicular to the longitudinal direction of the coated optical fiber 100, a rotary mirror 412 disposed at a focal point of the collimator lens 411 and capable of rotating about an axis passing through that focal point and in parallel with the longitudinal direction of the coated optical fiber 100, and a laser light source for emitting laser light to be input to a rotation center area of the rotary mirror 412, so that the laser light scanning section 410 can scan the coated optical fiber 100 with the laser light in a plane perpendicular to the longitudinal direction of the coated optical fiber 100. On the other hand, the reflection light detecting section 420 includes a collimator lens opposed to a side surface of the coated optical fiber 100 and having an optical axis perpendicular both to the longitudinal direction of the coated optical fiber 100 and to the optical axis of the collimator lens 411, a slit member 422 having a slit 422a at a rear focal point of the condenser lens 421, and a semiconductor position-sensitive device (PSD) 423 disposed behind the slit member 422 for detecting light passing through the slit 422a. Only part of the reflection light that travels in parallel with the optical axis of the condenser lens 421 can be detected by the PSD 423. A control section 430 estimates the coating state by processing data sent from the laser light scanning section 410 and the reflection light detecting section 420, and includes a rotary mirror driver 431 for providing a mirror drive signal to the rotary mirror 412 and outputting its sync signal, a PSD driver for processing an output signal of the PSD 423, an A/D converter for A/D-converting the sync signal from the rotary mirror driver and an output signal of the PSD driver 432, and a CPU 434 for processing a signal from the A/D converter 433 to determine the positional deviations of the incident light and the reflection light.

In the apparatus of FIG. 25, the condenser lens 421 and the slit member 422 are provided for selectively detecting part of the light reflected by the outer surface and part of the light reflected by the boundary surface that travel in particular directions. According to that apparatus, the coating state can be measured with simpler construction. It is apparent that the slit member 422 can be replaced by a member having a pinhole.

Figure 26:
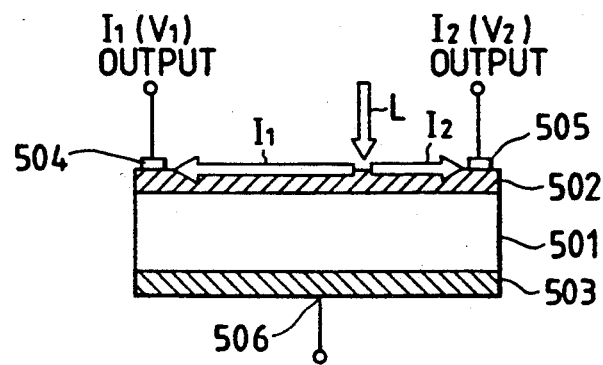
FIG. 26 shows a semiconductor position-sensitive device (PSD)

Referring to FIG. 26, a structure of the PSD 423 employed in this embodiment is described. As shown, the PSD 423 is constructed such that a p-type semiconductor layer 502 and an n-type semiconductor layer 503 are formed on a front side and a back side of a plate-like silicon substrate 501, and that position signal electrodes 504, 505 are formed at the both sides of the front surface and a reference electrode 506 is formed on the back surface. With this construction, when a light spot L is incident on a position on the front surface between the position signal electrodes 504, 505, an electric charge of an amount in proportion to an energy of the incident light is produced at the incident point and output from the position signal electrodes 504 and 505 in the form of photocurrents $I_1$ and $I_2$, respectively. Since each of the photocurrent $I_1$ and $I_2$ is in inverse proportion to a distance (i.e., a resistance) between the incident position of the light spot L and the position signal electrode 504 or 505, the incident position can be determined, for instance, by picking up the currents $I_1$ and $I_2$ in the form of voltages $V_1$ and $V_2$ measured with reference to a voltage of the reference electrode 506 and obtaining a division signal $(V_1-V_2)/(V_1+V_2)$. That is, the positional deviation of the reflection light can be determined from the incident positions of the light beams A and B.

Usually the PSD 423 is used for detecting the incident position of the light spot L in the above manner. In the invention, however, the positions of the scanning light when the reflection light beams A and B reach the PSD 423 are determined based on the scanning sync signal and a monitored relationship between time and an addition signal $(V_1+V_2)$. In this manner, the distance d between the incident light beams A' and B' corresponding to the light beams A and B can be determined.

As described above, according to the above embodiment, the distance $d_2$ of the reflection light and the distance $d_1$ of the incident light can be detected simultaneously by picking up, from the PSD 423, the addition signal in connection with time as well as the division signal.

The coating state measurement by the apparatus of FIG. 25 is now described. When a laser light beam from the laser light source 413 is moved by rotation of the rotary mirror 412 from the right to the left in FIG. 25, a light beam A reflected by the outer surface of the resin portion 100b of the coated optical fiber 100 is first detected by the PSD 423, and then a light beam B reflected by the boundary surface between the resin portion 100b and the glass portion 100a is detected. No other reflection light beams are detected by the PSD 423. Therefore, the distance d in the scanning direction between incident light beams A' and B' that respectively correspond to the reflection light beams A and B and the distance $d_2$ between the light beams A and B are determined based on outputs when the light beams A and B are detected and the sync signal from the rotary mirror driver 431.

The coating state measurement by the apparatus of FIG. 25 is actually performed in the following procedure. Scanning is performed with the laser light emitted from the laser light source 413 while the rotary mirror 412 is rotated in accordance with the mirror drive signal provided from the rotary mirror driver 431. The PSD driver 432 obtains the addition signal $(V_1+V_2)$ and the division signal $(V_1-V_2)/(V_1+V_2)$ based on the outputs of the PSD 423. The CPU 434 monitors the addition signal $(V_1+V_2)$ in connection with time using the sync signal as a reference and, at the same time, calculates values of the division signal $(V_1-V_2)/(V_1+V_2)$ when the addition signal take its peaks.

Figure 27:
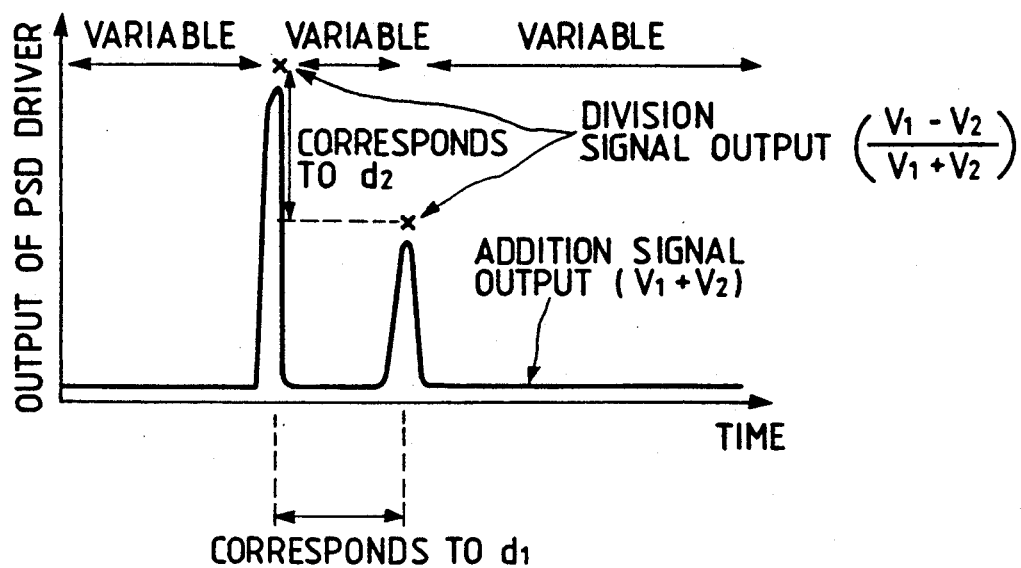
FIG. 27 shows an example of an output signal of a PSD driver.

FIG. 27 shows an example of an output of the PSD driver 432. As shown, the distance $d_1$ can be determined from peak positions of the addition signal output, and $d_2$ from values of the division signal output when the peaks are generated. The coating state can be estimated using the distances $d_1$ and $d_2$ thus determined.

While in the apparatus of FIG. 25 the reflection light passing through the slit 422a of the slit member 422 is directly received by the PSD 423, it is more appropriate that a collimator lens be disposed between the slit member 422 and the PSD 432 such that its focal point is located at the slit 422a, to obtain vertical incidence of the reflection light on the PSD 423.

If two sets or more of the above apparatuses are provided, the thickness variation can be measured even if the outer radius $r_2$ of the resin portion 100b, refractive index of the resin portion 100b and refractive index $n_1$ of the ambient area are unknown.

Where the output light is not properly be detected by the PSD 423 because of a large difference between the reflectivity of the outer surface of the resin portion 100b and that of the boundary surface between the resin portion 100b and the glass portion 100a, it is preferable that a refractive index matching agent be provided around the coated optical fiber 100 to reduce the difference in reflectivity.

Figure 28:
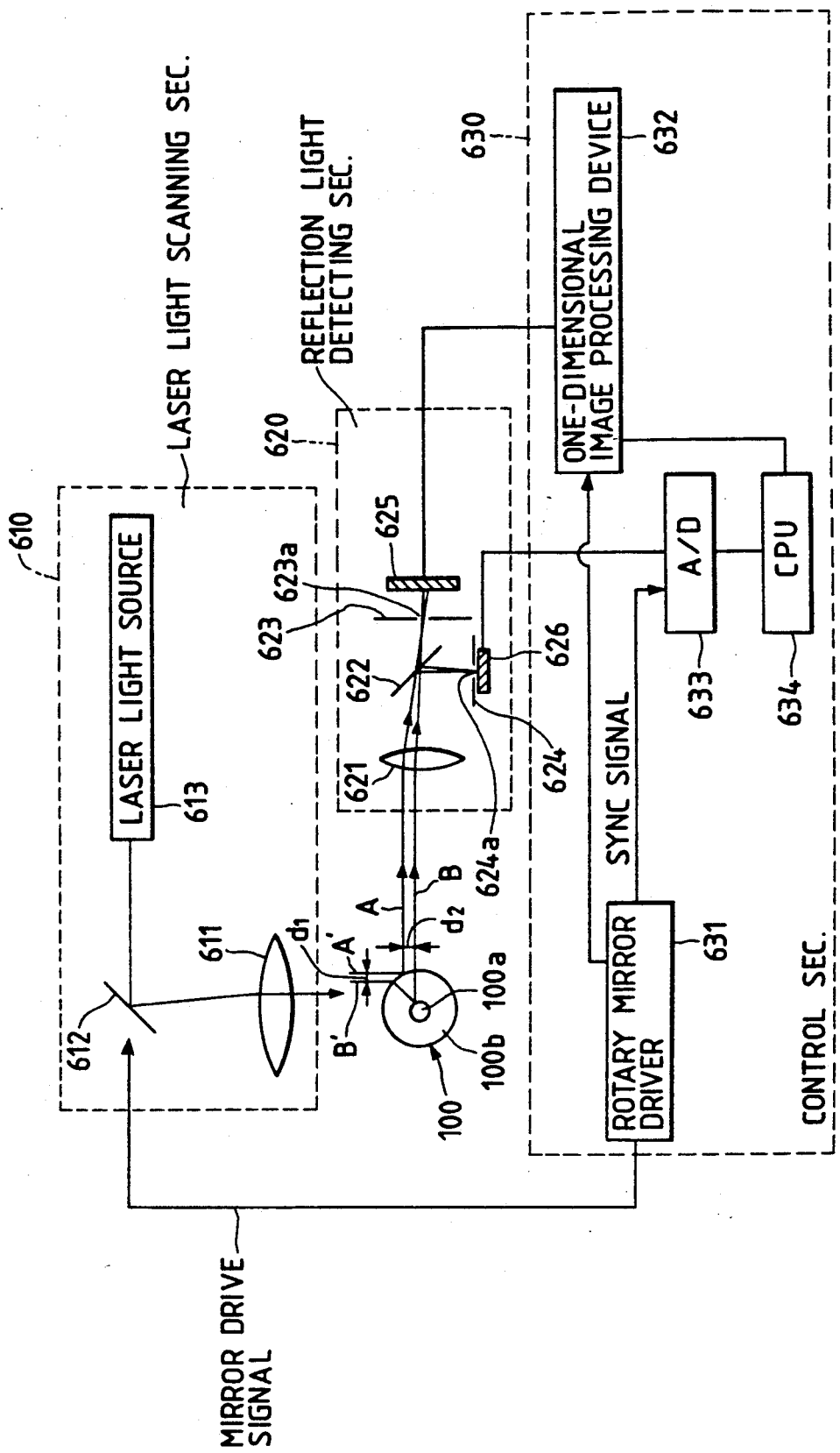
FIG. 28 shows a coating state measuring apparatus according to still another embodiment of the present invention, which employs laser light scanning.

FIG. 28 conceptually shows still another coating state measuring apparatus utilizing laser light scanning. As shown, a laser light scanning section 610 and a reflection light detecting section 620 are laterally spaced from a coated optical fiber 100 as an example of an object linear body. The laser light scanning section 610 includes a collimator lens 611 opposed to a side surface of the coated optical fiber 100 and having an optical axis perpendicular to the longitudinal direction of the coated optical fiber 100, a rotary mirror 612 disposed at a focal point of the collimator lens 611 and capable of rotating about an axis passing through that focal point and in parallel with the longitudinal direction of the coated optical fiber 100, and a laser light source 613 for emitting laser light to be input to a rotation center area of the rotary mirror 612, so that scanning is performed with the laser light in a plane perpendicular to the longitudinal direction of the coated optical fiber 100. On the other hand, the reflection light detecting section 620 includes a condenser lens 621 opposed to a side surface of the coated optical fiber 100 and having an optical axis perpendicular both to the longitudinal direction of the coated optical fiber 100 and to the optical axis of the collimator lens 611, a beam splitter 622 disposed behind the condenser lens 621, slit members 623 and 624 having respective slits 623a and 624b disposed at respective focal points for light beams split by the beam splitter 622, a one-dimensional image sensor 625 for detecting light passing through the slit 623a, and a photodetector 626 such as a photodiode for detecting light passing through the slit 624a, so that only part of the reflection light that is in parallel with the optical axis of the condenser lens 621 is detected by the one-dimensional image sensor 625 or photodetector 626.

Receiving the reflection light, the one-dimensional image sensor 625 produces information on the position in the top-bottom direction in FIG. 28, and the photodetector 626 converts it into an electrical signal. A control section 630 processes data sent from the laser light scanning section 610 and the reflection light detecting section 620 to estimate the coating state, and includes a rotary mirror driver 631 for providing a mirror drive signal to the rotary mirror 612 and outputting its sync signal, a one-dimensional image processing device 632 for receiving a sync signal from the rotary mirror driver 631 and for reading information from the one-dimensional image sensor 625 at regular intervals and processing the readout information, an A/D converter 633 for A/D-converting a sync signal from the rotary mirror driver 631 and an output signal of the photodetector 623, and a CPU 634 for processing signals from the one-dimensional image processing device 632 and the A/D converter 633.

In this embodiment, the term "image sensor" means a solid-state image pickup device which receives incident light by an array of MOS transistors or CCD memories and converts the light into an electrical signal by electronically scanning outputs of individual cells. The term "photodetector" means an element for outputting an electrical signal in accordance with received light quantity. Further, it is apparent that the slit members 623 and 624 can be replaced by a member having a pinhole.

The coating state measurement by the apparatus of FIG. 28 is now described. When a laser light beam from the laser light source 613 is moved by rotation of the rotary mirror 612 from the right to the left in FIG. 28, a light beam A reflected by the outer surface of the resin portion 100b of the coated optical fiber 100 is first detected by the one-dimensional image sensor 625 and by the photodetector 626, and then a light beam B reflected by the boundary surface between the resin portion 100b and the glass portion 100a is detected. No other reflection light beams are detected by the detectors 625 and 626. Therefore, the distance $d_2$ in the direction perpendicular to the reflection light beams A and B can be determined based on the detecting positions of the light beams A and B on the one-dimensional image sensor 625, and the distance $d_1$ in the scanning direction between the incident light beams A' and B' that respectively correspond to the reflection light beams A and B is determined based on output signals from the photodetector 626 when the light beams A and B are detected and the sync signal from the rotary mirror driver 631.

An example of measuring the positional deviation d of the incident light and the positional deviation $d_2$ of the reflection light using the apparatus of FIG. 28 is described below in detail.

Figure 29:
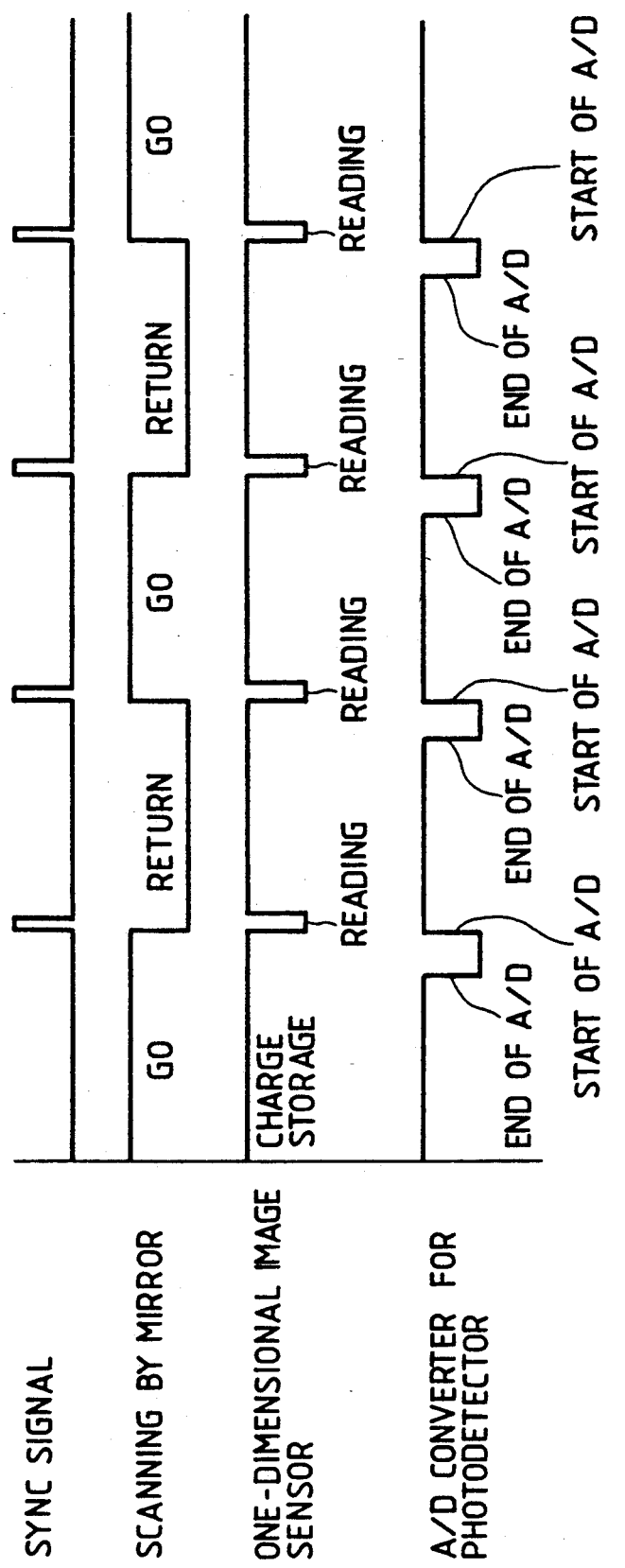
FIG. 29 shows a timing chart of the apparatus of FIG. 28.
Figure 30:
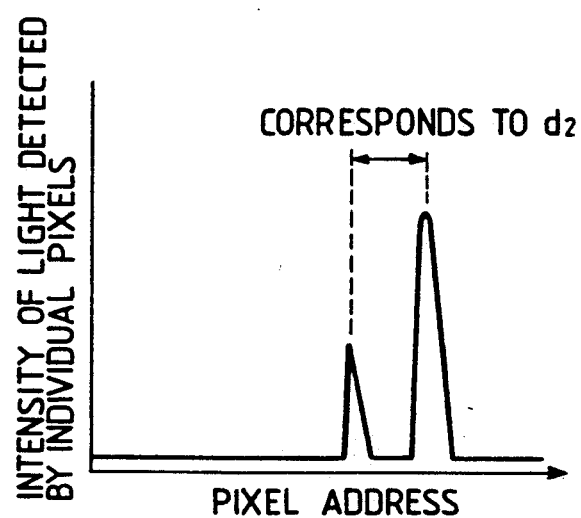
FIG. 30 shows an example of a detection signal of a one-dimensional image sensor in the apparatus of FIG. 28.

FIG. 29 shows a timing chart of the thickness variation measurement according to this embodiment. As shown, a side surface of the coated optical fiber 100 is scanned in a reciprocating manner with the laser light emitted from the laser light source 613 by a go-and-return rotational movement of the rotary mirror 612 performed in accordance with the mirror drive signal sent from the rotary mirror driver 631. The resulting reflection light beams A and B are detected by the one-dimensional image sensor 625 and the photodetector 626. The rotary mirror driver 631 outputs a sync pulse every time the scanning direction is reversed. The one-dimensional image sensor 625 accumulates charges during one scan (i.e., one going or returning scan), and the one-dimensional image processing device 632 reads the detection signal upon reversing of the scanning direction (i.e., outputting of a scanning pulse). For example, the output signal can be obtained, for instance, in the form of a relationship between the intensity of the light received by individual pixels and a pixel address, as shown in FIG. 30. The distance $d_2$ can be determined from a positional relationship between outputs of the light beams A and B.

Figure 31:
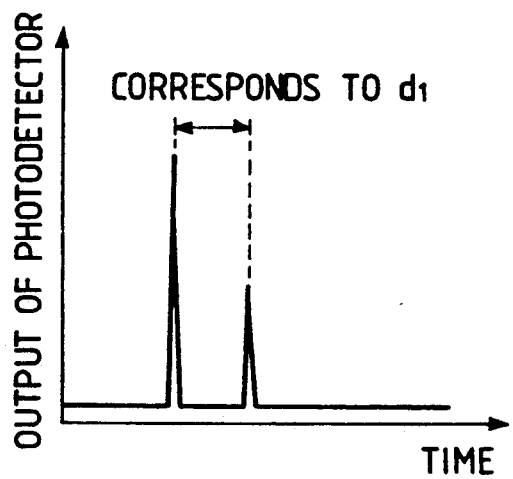
FIG. 31 shows an example of an output signal of a photodetector used in the apparatus of FIG. 28.

On the other hand, the photodetector 626 provides a signal to the A/D converter 633 when receiving the reflection light. The A/D converter 633 outputs an A/D-converted signal during a predetermined period from the outputting of a sync pulse to a little before the outputting of the next sync pulse. With this operation, a time interval between detection of the two reflection light beams A and B, that is, output peaks are obtained as shown in FIG. 31, and the distance $d_1$ between the incident light beams A, and B, can be determined from a time interval between the two peaks.

Using the distances $d_1$ and $d_2$ thus determined, the coating state can be estimated in the manner as described above.

While various embodiments are described in the foregoing, techniques of improving the accuracy of the coating state measurement are described below, which are applicable to each of the above embodiments.

The above-described coating state measuring methods may encounter such a difficulty as caused by a fact that the light reflected by the boundary surface has a smaller light quantity than the light reflected by the outer surface. Such a difficulty can be avoided by detecting only a light component having a polarization direction perpendicular to the longitudinal direction of the cylindrical linear body, for instance, by incorporating a polarizer into the light emitting section or by incorporating an analyzer into the light detecting section. This is because with respect to the light component having such a polarization direction the quantity of the light reflected by the boundary surface is relatively enhanced with respect to that of the light reflected by the outer surface. It is apparent that the polarizer or analyzer is not necessary if the light source for the measuring light emits polarized laser light.

Figure 32:
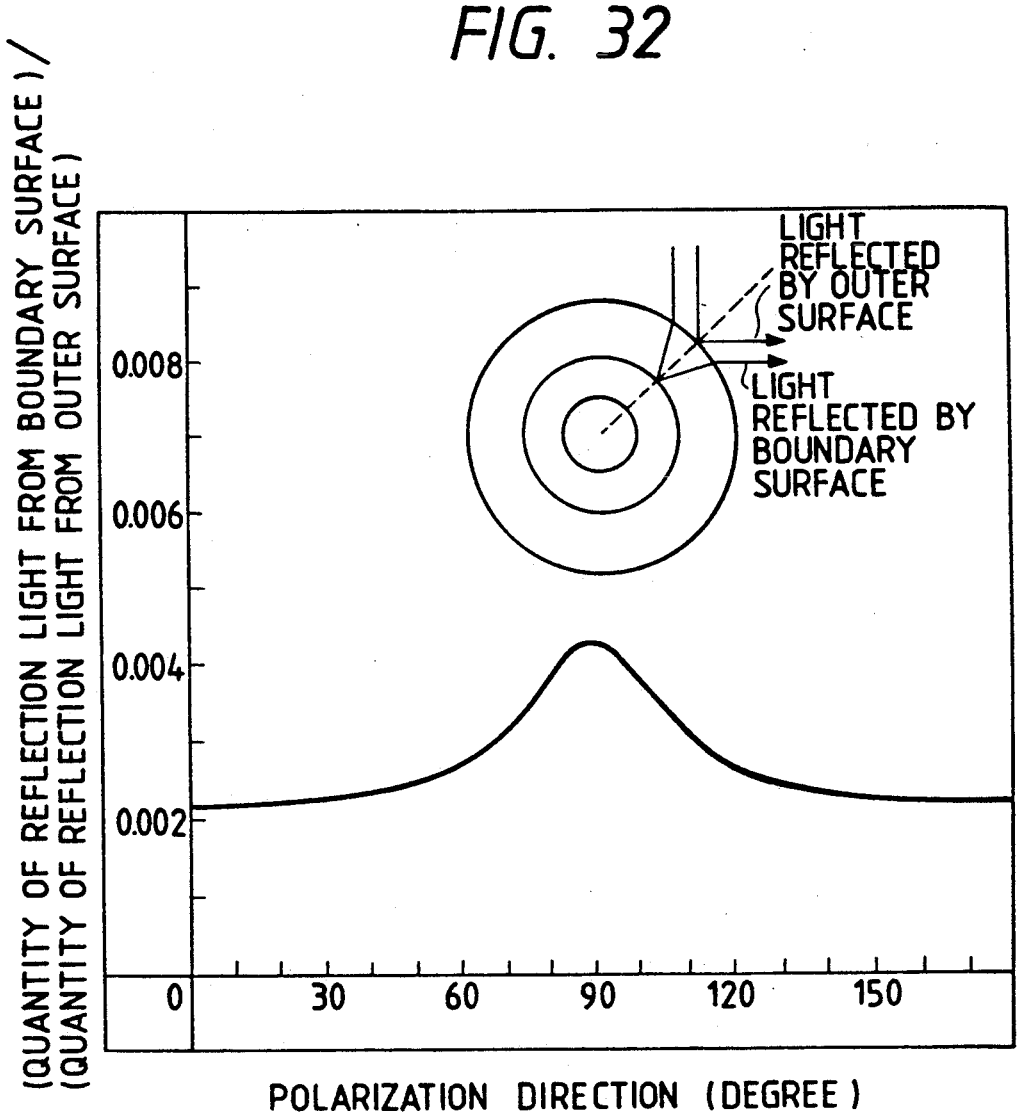
FIG. 32 is a graph showing a relationship between a polarization direction and a ratio of a quantity of light reflected by a boundary surface to a quantity of light reflected by an outer surface.

FIG. 32 shows a relationship between a polarization direction and a ratio of a quantity of light reflected by a boundary surface between a first and a second coating layer to a quantity of light reflected by the outer surface in the case of a coated optical fiber having, around a glass portion, the first coating layer of 180 μm in diameter and 1.497 in refractive index and the second coating layer of 250 μm in diameter and 1.51 in refractive index. An angle between the incident light and the reflection light to be measured was set at 90°. As is understood from the figure, the quantity of the light reflected by the boundary surface is relatively increased with respect to that of the light reflected by the outer surface at polarization directions in the vicinity of 90° that is a polarization direction perpendicular to the longitudinal direction of the coated optical fiber. The measurement of the light reflected by the boundary surface becomes more positive by detecting the light component having such a polarization direction.

A similar improvement is also obtained in connection with the reflection at the boundary surface between the coating layer and the glass portion depending on a refractive index difference at that boundary. The improvement is more remarkable in the case of the reflection at the boundary between the coating layer and the glass portion, where the refractive index difference is generally larger than the case of the above example.

Instead of using the polarizer or analyzer, the improvement of detectability of the light reflected by the boundary is similarly obtained by detecting the light reflected by the outer surface and the light reflected by the boundary surface while employing, as the light beam traveling in the particular direction, a reflection light beam resulting from an incident light beam, among measuring light beams, that is incident on the coating surface of the cylindrical linear body at a Brewster angle. The improvement is furthered by employing, as described above, a light component having a polarization direction perpendicular to the longitudinal direction of the coated optical fiber as the measuring light.

Figure 33:
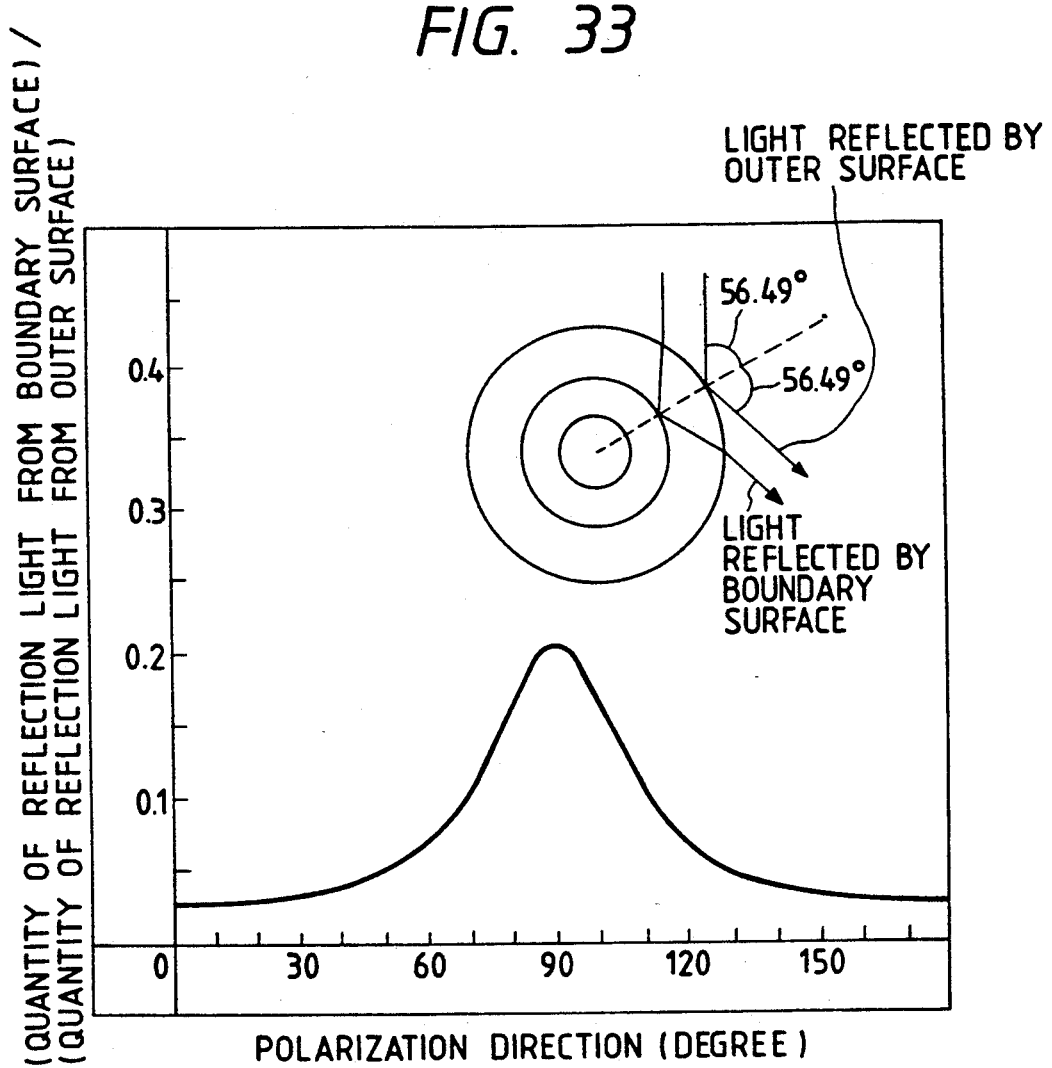
FIG. 33 is a graph showing a relationship similar to that of FIG. 32, where measuring light is incident at a Brewster angle.

FIG. 33 shows how the ratio of a quantity of light reflected by a boundary surface, to that of light reflected by the outer surface varies as the polarization direction of the incident light is changed, with such settings that there is prepared a coated optical fiber having, around a glass portion, a first coating layer of 180 μm in diameter and 1.497 in refractive index and a second coating layer of 250 μm in diameter and 1.51 in refractive index and that the reflection light beams are detected in such a direction as one can detect the light beams resulting from incident light entering the coated optical fiber at a Brewster angle $\theta$ of 56.49° ($=\tan^{-1}(1.51)$). As shown, as a result of using the incident light having a polarization direction perpendicular to the longitudinal direction of the coated optical fiber and inputting that incident light at the Brewster angle $\theta$, the quantity of the light reflected by the boundary surface is further enhanced relatively, whereby the light reflected by the boundary surface can be detected more easily.

As described in the foregoing, according to the invention, the coating state can be measured correctly in a continuous manner by detecting the light reflected by the coating outer surface to a particular direction and the light reflected by the boundary surface between the coating and the main body of the linear body to the particular direction. For example, in a manufacturing line of optical fibers, the coating state of optical fibers can be measured within the line.

What is claimed is:

1. A coating state measuring method comprising the steps of:
   irradiating, with incident light, a side surface of a cylindrical linear body having a main body and a coating of at least one layer formed on the main body;
   detecting a surface refection light beam reflected by an outer surface of the coating to at least one particular direction and a boundary reflection light beam reflected by a boundary surface between the coating and the main body or by boundary surface between adjacent layers of the coating to a direction in parallel with the particular direction;
   determining a center of the main body based on a refection light distance between the surface reflection light beam and the boundary reflection light; and
   determining a thickness and a variation of the thickness of the coating based on an eccentricity of the center of the main body from a center of the cylindrical linear body.

2. The method of claim 1, wherein in the determining a center step the center of the main body is determined further based on an incident light beam corresponding to the surface reflection light beam and another incident light beam corresponding to the boundary reflection light beam.

3. The method of claim 2, wherein the incident light is laser light, in the detecting step the surface reflection light beam and the boundary reflection light beam are detected by a position-sensitive device, and in the main body center determining step the distance between the reflection light beams is determined based on a variation of a central position of the light detected by the position-sensitive device and the distance between the incident light beams is determined based on an intensity variation of the light detected by the position-sensitive device.

4. The method of claim 1, wherein the incident light is substantially parallel light, and in the detecting step images of reflecting points on the outer surface and on the boundary surface are detected by an image pickup optical system having an image pickup device.

5. The method of claim 4, wherein the substantially parallel light is slit light extending in a direction perpendicular to a longitudinal direction of the cylindrical linear body.

6. The method of claim 4, wherein the substantially parallel light is pulsed light, and further comprising the step of driving the image pickup device while synchronizing an emission timing of the pulsed light and a detection timing of the image pickup device.

7. The method of claim 4, wherein at least part of the image pickup optical system is inclined from a plane perpendicular to a longitudinal direction of the cylindrical linear body so that a focusing point in the image pickup optical system varies depending on a position of the cylindrical linear body in its longitudinal direction.

8. The method of claim 1 or 2, wherein the incident light is laser scanning light, and in the detecting step images of reflecting points on the outer surface and on the boundary surface are detected by an image pickup optical system having an image pickup device.

9. The method of claim 1 or 2, wherein the incident light is laser light, in the detecting step the surface reflection light beam and the boundary reflecting light beam are detected by a position-sensitive device, and in the main body center determining step the distance between the reflection light beams are determined based on a variation of a central position of the light detected by the position-sensitive device.

10. A coating state measuring method comprising the steps of:
irradiating, with incident light, a side surface of a cylindrical linear body having a main body and a coating of at least one layer formed on the main body;
detecting a surface reflection light beam reflected by an outer surface of the coating to at least one particular direction and a boundary reflection light beam reflected by a boundary surface between the coating and the main body or by a boundary surface between adjacent layers of the coating to a direction in parallel with the particular direction; and
determining a thickness and a variation of the thickness of the coating based on an incident light distance between an incident light beam corresponding to the surface reflection light beam and another incident light beam corresponding to the boundary reflection light beam.

11. The method of claim 10, wherein the incident light is laser scanning light, and in the detecting step the surface reflection light beam and the boundary reflection light beam are detected by a photodetector, and in the determining step the distance between the incident light beams are determined based on a temporal variation of an output signal of the photodetector and a speed of the laser light scanning.

12. The method of claim 1, 10 or 2, wherein in the detecting step a detection optical system comprises a diaphragm so as to limit its light-receiving numerical aperture.

13. The method of claim 12, wherein the diaphragm is a pinhole or a slit disposed in a focal plane of a lens system having an optical axis in parallel with the particular direction and focusing parallel light in one point on the focal plane.

14. The method of claim 1, 10 or 2, wherein the incident light is linearly polarized light having a polarization direction perpendicular to a longitudinal direction of the cylindrical linear body, or in the detecting step only a light component having a polarization direction perpendicular to a longitudinal direction of the cylindrical linear body is detected.

15. The method of claim 1, 10 or 2, wherein a light beam incident on the outer surface of the coating at a Brewster angle is reflected to the particular direction.

16. The method of claim 1, 10 or 2, further comprising the step of providing a refractive index matching agent around the coating to reduce a difference between reflectivities of the outer surface and the boundary surface.

17. A coating state measuring apparatus comprising:
means for irradiating, with incident light, a side surface of a cylindrical linear body having a main body and a coating of at least one layer formed on the main body;
means for detecting a surface reflection light beam reflected by an outer surface of the coating to at last one particular direction and a boundary reflection light beam reflected by a boundary surface between the coating and the main body or by boundary surface between adjacent layers of the coating to a direction in parallel with the particular direction;
means for determining a center of the main body based on a reflection light distance between the surface reflection light beam and the boundary reflection light beam; and
means for determining a thickness and a variation of the thickness of the coating based on an eccentricity of the center of the main body from a center of the cylindrical linear body.

18. The apparatus of claim 17, wherein the main body center determining means determines the center of the main body further based on an incident light beam corresponding to the surface reflection light beam and another incident light beam corresponding to the boundary reflection light beam.

19. The apparatus of claim 18, wherein the irradiating means comprises a laser light source for emitting laser light and a mechanism of scanning the side surface of the cylindrical linear body with the laser light, the detecting means comprises a position-sensitive device for detecting the surface reflection light beam and the boundary reflection light beam, and the main body center determining means comprises a circuit for determining the distance between the reflection light beams base don a variation of a central position of the light detected by the position-sensitive device and for determining the distance between the incident light beams based on an intensity variation of the light detected by the position-sensitive device.

20. The apparatus of claim 17, wherein the irradiating means comprises a light source for emitting substantially parallel light, and the detecting means comprises an image pickup optical system having an image pickup device.

21. The apparatus of claim 20, wherein the irradiating means further comprises means for generating slit light extending in a direction perpendicular to a longitudinal direction of the cylindrical linear body.

22. The apparatus of claim 20, wherein the light source is a pulsed light source, and the irradiating means further comprises a synchronizing circuit for synchronizing an emission timing of the pulsed light source and a detection timing of the image pickup device.

23. The apparatus of claim 20, wherein at least part of the image pickup optical system is inclined from a plane perpendicular to a longitudinal direction of the cylindrical linear body so that a focusing point in the image pickup optical system varies depending on a position of the cylindrical linear body in its longitudinal direction.

24. The apparatus of claim 17 or 18, wherein the irradiating means comprises a laser light source for emitting laser light and a mechanism of scanning the side surface of the cylindrical linear body with the laser light, and the detecting means comprises an image pickup optical system having an image pickup device.

25. The apparatus of claim 17 or 18, wherein the irradiating means comprises a laser light source for emitting laser light and a mechanism of scanning the side surface of the cylindrical linear body with the laser light, the detecting means comprises a position-sensitive device for detecting the surface reflection light beam and the boundary reflection light beam, and the main body center determining means comprises a circuit for determining the distance between the reflection light beams based on a variation of a central position of the light detected by the position-sensitive device.

26. A coating state measuring apparatus comprising:
means for irradiating, with incident light, a side surface of a cylindrical linear body having a main body and a coating of at least one layer formed on the main body;
means for detecting a surface reflection light beam reflected by an outer surface of the coating to at least one particular direction and a boundary reflection light beam reflected by a boundary surface between the coating and the main body or by a boundary surface between the adjacent layers of the coating to a direction in parallel with the particular direction; and
means for determining a thickness and a variation of the thickness of the coating based on an incident light distance between an incident light beam corresponding to the surface reflection light beam and another incident light beam corresponding to the boundary reflection light beam.

27. The apparatus of claim 26, wherein the irradiating means comprises a laser light source for emitting laser light and a mechanism of scanning the side surface of the cylindrical linear body with the laser light, the detecting means comprises a photodetector for detecting the surface reflection light beam and the boundary reflection light beam, and the determining means comprises a circuit for determining the distance between the incident light beams based on a temporal variation of an output signal of the photodetector and a speed of the layer light scanning.

28. The apparatus of claim 17, 26 or 18, wherein the irradiating means comprises a diaphragm for limiting a light-receiving numerical aperture of a detection optical system.

29. The apparatus of claim 28, wherein the diaphragm is a pinhole or a slit disposed in a focal plane of a lens system having an optical axis in parallel with the particular direction and focusing parallel light on one point in the focal plane.

30. The apparatus of claim 17, 26 or 18, wherein the irradiating means produces linearly polarized incident light having a polarization direction perpendicular to a longitudinal direction of the cylindrical linear body, or the detecting means detects only a light component having a polarization direction perpendicular to a longitudinal direction of the cylindrical linear body.

31. The apparatus of claim 17, 26 or 18, wherein an optical axis of the irradiating means and an optical axis of the detecting means form a Brewster angle with respect to a normal to the outer surface of the coating at a reflecting point.

32. The apparatus of claim 17, 26 or 18, wherein a refractive index matching agent is provided around the coating to reduce a difference between reflectivities of the outer surface and the boundary surface.

* * * * *